US011331940B2

(12) United States Patent
Araki

(10) Patent No.: US 11,331,940 B2
(45) Date of Patent: May 17, 2022

(54) INK JET RECORDING METHOD AND METHOD FOR MANUFACTURING LAMINATED PRINTED MATTER

(71) Applicant: FUJIFILM CORPORATION, Tokyo (JP)

(72) Inventor: Kenjiro Araki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 427 days.

(21) Appl. No.: 16/517,694

(22) Filed: Jul. 22, 2019

(65) Prior Publication Data

US 2019/0337319 A1 Nov. 7, 2019

Related U.S. Application Data

(63) Continuation of application No. PCT/JP2017/046784, filed on Dec. 26, 2017.

(30) Foreign Application Priority Data

Jan. 31, 2017 (JP) .............................. JP2017-015857

(51) Int. Cl.
*B41M 7/00* (2006.01)
*B41M 5/00* (2006.01)
*B41J 15/16* (2006.01)

(52) U.S. Cl.
CPC ........ *B41M 7/0027* (2013.01); *B41M 5/0064* (2013.01); *B41J 15/16* (2013.01); *B41M 5/0047* (2013.01); *B41M 7/0081* (2013.01)

(58) Field of Classification Search
CPC .............. B41M 5/0047; B41M 5/0064; B41M 7/0027; B41M 7/0081; C09D 11/101
See application file for complete search history.

(56) References Cited

U.S. PATENT DOCUMENTS 9,017,779 B2 * 4/2015 Ikeda ................... B41M 5/5254
428/32.17
2004/0119802 A1 6/2004 Yoneyama et al.
(Continued)

FOREIGN PATENT DOCUMENTS

CN 102190172 A 9/2011
CN 102294875 A 12/2011
(Continued)

OTHER PUBLICATIONS

International Search Report issued in International Application No. PCT/JP2017/046784 dated Feb. 27, 2018.
(Continued)

*Primary Examiner* — Gerard Higgins
(74) *Attorney, Agent, or Firm* — Solaris Intellectual Property Group, PLLC

(57) ABSTRACT

An ink jet recording method includes the steps of ejecting an active-radiation-curable ink composition onto a recording medium by an ink jet process and curing the ejected ink composition by irradiation with active radiation. During transporting of the recording medium in the ejecting and curing steps, an unwinding stress in the recording medium is larger than a winding stress in the recording medium. The recording medium has a thickness of 10 μm to 100 μm. Also provided is a method for manufacturing laminated printed matter using printed matter produced by the ink jet recording method.

12 Claims, 2 Drawing Sheets

(56) References Cited

U.S. PATENT DOCUMENTS

| | | | |
|---|---|---|---|
| 2008/0090929 A1* | 4/2008 | Wilson | C09D 11/101 522/75 |
| 2009/0302145 A1 | 12/2009 | deJong et al. | |
| 2011/0205278 A1 | 8/2011 | Haba | |
| 2012/0113199 A1 | 5/2012 | Edwards | |
| 2013/0141485 A1 | 6/2013 | Hamamoto | |
| 2017/0348988 A1* | 12/2017 | Nakata | B41J 15/16 |

FOREIGN PATENT DOCUMENTS

| | | |
|---|---|---|
| CN | 105017548 A | 11/2015 |
| CN | 204870068 U | 12/2015 |
| CN | 205255713 U | 5/2016 |
| JP | 2004-91151 A | 3/2004 |
| JP | 2004-188966 A | 7/2004 |
| JP | 2004-209706 A | 7/2004 |
| JP | 2009-184206 A | 8/2009 |
| JP | 2009-298594 A | 12/2009 |
| JP | 2010-131786 A | 6/2010 |
| JP | 2012-192545 A | 10/2012 |
| JP | 2013-116787 A | 6/2013 |
| JP | 2015-58616 A | 3/2015 |
| JP | 2016-135711 A | 7/2016 |

OTHER PUBLICATIONS

Written Opinion of the ISA issued in International Application No. PCT/JP2017/046784 dated Feb. 27, 2018.

English language translation of the following: Office action dated Aug. 13, 2020 from the SIPO in a Chinese patent application No. 201780085061.4 corresponding to the instant patent application. This office action translation is submitted now in order to supplement the understanding of the cited references which are being disclosed in the instant Information Disclosure Statement.

Extended European Search Report dated Feb. 5, 2020, issued in corresponding EP Patent Application No. 17895297.4.

\* cited by examiner

INK JET RECORDING METHOD AND METHOD FOR MANUFACTURING LAMINATED PRINTED MATTER

CROSS-REFERENCE TO RELATED APPLICATIONS

This application is a Continuation of International Application No. PCT/JP2017/046784 filed on Dec. 26, 2017, which claims priority to Japanese Patent Application No. 2017-015857 filed on Jan. 31, 2017. The entire contents of these applications are incorporated herein by reference.

BACKGROUND OF THE INVENTION

1. Field of the Invention

The present disclosure relates to ink jet recording methods and methods for manufacturing laminated printed matter.

2. Description of the Related Art

Image recording methods for forming images on recording media such as paper based on image data signals include electrophotographic processes, dye-sublimation processes, hot-melt thermal transfer processes, and ink jet processes.

Ink jet processes use inexpensive printers. In addition, ink jet processes require no plate for printing; instead, images are directly formed on recording media by ejecting ink compositions only into the required image areas. Thus, ink jet processes allow for efficient use of ink compositions and have low operating cost, particularly for small-lot production. Furthermore, ink jet processes cause low noise and are superior image recording processes that have recently attracted attention.

In particular, ink jet recording ink compositions that are curable by irradiation with radiation such as ultraviolet radiation (radiation-curable ink jet recording ink compositions) have better drying performance than solvent-based ink compositions since most of the components of these ink compositions cure upon irradiation with radiation such as ultraviolet radiation. These ink compositions are also superior because they form images resistant to bleeding and can thus be used for printing on various recording media.

Printing on soft packages has so far been mainly performed by conventional printing processes such as gravure printing and flexography. Soft packaging materials using various resin films are used for the packaging of food, confectionery, household goods, pet food, and other products from the viewpoint of functions such as design, economy, contents protection, and transportation. In addition, many soft packaging materials are subjected to printing in order to add designs and messages appealing to consumers. However, digital printing, which can meet increased demand for small-lot printing, has also recently attracted attention in the field of soft packaging. Digital printing eliminates the need for plate fabrication and color registration and thus allows for cost reduction, particularly for small-lot printing. In addition, digital printing requires less time for preparation and thus contributes to shorter printing time.

Known image recording apparatuses include those described in JP2015-58616A and JP2012-192545A.

JP2015-58616A describes a printing apparatus including a printing unit that can eject a liquid onto a recording medium, a support unit that supports the recording medium onto which the liquid is to be ejected by the printing unit while applying tension thereto and that sends the recording medium after the liquid is deposited thereon, an irradiation unit that can irradiate the recording medium sent from the support unit with light, and a winding unit that winds the recording medium irradiated with the light.

JP2012-192545A describes an image-forming apparatus having a transport unit that transports an elongated recording medium, an image-forming unit that forms an image on the recording medium transported by the transport unit, a tension control unit that controls the tension applied to the recording medium while the recording medium is being transported by the transport unit, an imaging unit that picks up the image formed on the recording medium by the image-forming unit, and a main control unit that controls the transport unit, the image-forming unit, the tension control unit, and the imaging unit and that executes arithmetic operations. The main control unit controls the tension control unit to apply a first tension to the recording medium and controls the image-forming unit to form an image in a predetermined pattern. While the first tension is being applied to the recording medium, the main control unit controls the imaging unit to pick up first image data associated with the predetermined pattern and acquire a first distance from the first image data. The main control unit controls the transport unit to stop the transport of the recording medium and, while a second tension different from the first tension is being applied to the recording medium, controls the imaging unit to pick up second image data associated with the predetermined pattern and acquire a second distance from the second image data. The main control unit calculates the relational formula between the tension applied to the recording medium and the amount of elongation from the first and second distances.

SUMMARY OF THE INVENTION

An object of one embodiment of the present invention is to provide an ink jet recording method with high adhesiveness between a cured film of an ink composition and a recording medium.

Another object of another embodiment of the present invention is to provide a method for manufacturing laminated printed matter with high adhesiveness between a cured film of an ink composition and a recording medium.

Solutions to achieve the foregoing objects include the following aspects.

[1] An ink jet recording method includes the steps of ejecting an active-radiation-curable ink composition onto a recording medium by an ink jet process and curing the ejected ink composition by irradiation with active radiation. During transporting of the recording medium in the ejecting and curing steps, an unwinding stress in the recording medium is larger than a winding stress in the recording medium. The recording medium has a thickness of 10 μm to 100 μm.

[2] In the ink jet recording method according to [1] above, the value of subtracting the winding stress from the unwinding stress is 50 Pa to 250 Pa.

[3] In the ink jet recording method according to [1] or [2] above, $F^A$ defined by the following equation is 2 to 17.

$$F^A = \text{(unwinding stress–winding stress)/(volume shrinkage of ink composition after curing)}$$

[4] In the ink jet recording method according to any one of [1] to [3] above, the winding stress is 20 Pa to 160 Pa.

[5] In the ink jet recording method according to any one of [1] to [4] above, the unwinding stress is 100 Pa to 270 Pa.

[6] In the ink jet recording method according to any one of [1] to [5] above, the recording medium is a resin film containing at least one resin selected from the group consisting of polyethylene terephthalate, polyethylene, polypropylene, and nylon.

[7] In the ink jet recording method according to any one of [1] to [6] above, the ink composition has a viscosity of 5 mPa·s to 30 mPa·s at 23° C.

[8] In the ink jet recording method according to any one of [1] to [7] above, the light source of the active radiation is a light-emitting diode.

[9] In the ink jet recording method according to any one of [1] to [8] above, the ink composition contains a polymerizable compound and a photopolymerization initiator.

[10] In the ink jet recording method according to [9] above, the polymerizable compound includes a di- or higher-functional polymerizable compound.

[11] In the ink jet recording method according to [10] above, a content of the di- or higher-functional polymerizable compound is 50% by mass or more based on a total mass of the ink composition.

[12] In the ink jet recording method according to any one of [1] to [11] above, the ink composition is irradiated with the active radiation in an atmosphere with an oxygen partial pressure of 0.15 atm or less in the curing step.

[13] A method for manufacturing laminated printed matter includes a step of laminating a lamination film on a surface, on which an ink composition has been cured, of printed matter produced by the ink jet recording method according to any one of [1] to [12] above.

According to one embodiment of the present invention, an ink jet recording method with high adhesiveness between a cured film of an ink composition and a recording medium can be provided.

According to another embodiment of the present invention, a method for manufacturing laminated printed matter with high adhesiveness between a cured film of an ink composition and a recording medium can be provided.

DESCRIPTION OF THE PREFERRED EMBODIMENTS

Figure 1:
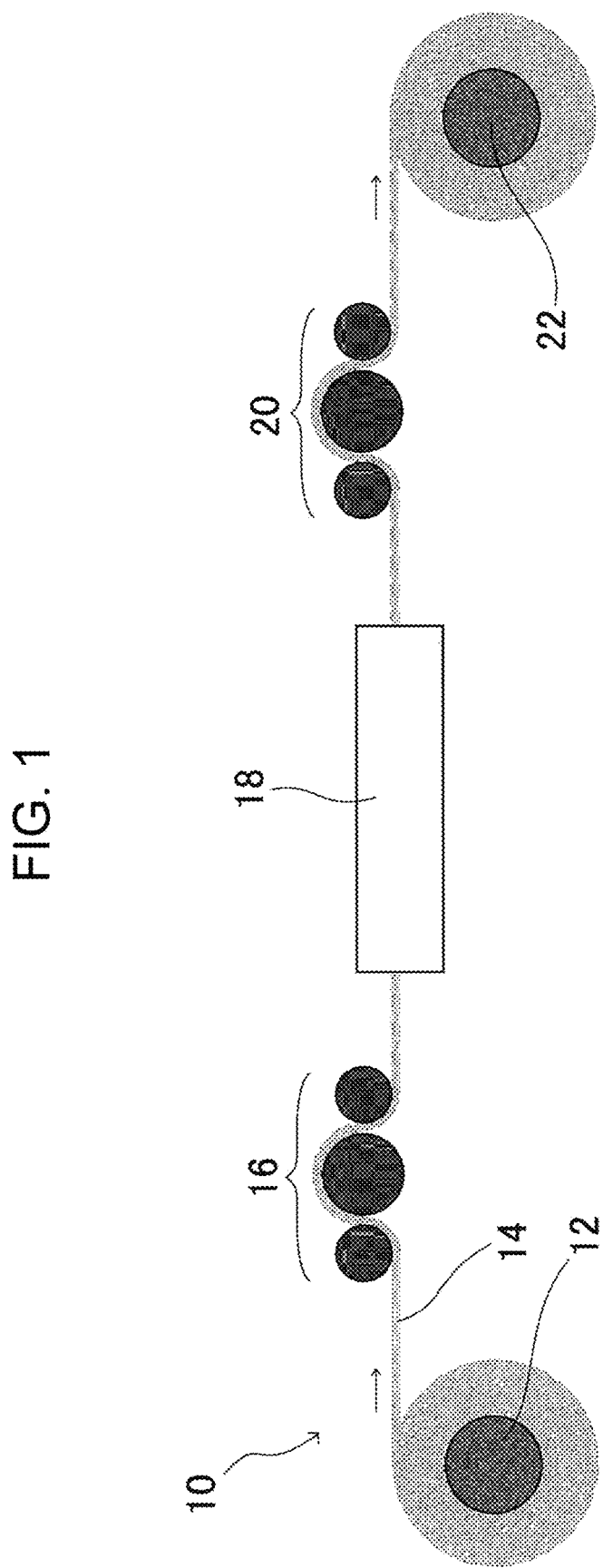
FIG. 1 is a schematic sectional view of an example ink jet recording apparatus suitable for use in an ink jet recording method according to the present disclosure.

The present disclosure will hereinafter be described in detail.

As used herein, the phrase "xx to yy" refers to a numerical range including xx and yy.

As used herein, the term "step" includes not only independent steps, but also steps that cannot be clearly distinguished from other steps, provided that the intended purposes of those steps are achieved.

"(Meth)acrylate" and the like are synonymous with "acrylate and/or methacrylate" and the like. The same applies hereinafter.

In the present disclosure, hydrocarbyl groups such as alkyl, aryl, alkylene, and arylene groups may be branched or cyclic unless otherwise specified.

In the present disclosure, "% by mass" is synonymous with "% by weight", and "parts by mass" is synonymous with "parts by weight".

In the present disclosure, combinations of two or more preferred forms are more preferred forms.

In the present disclosure, weight average molecular weight (Mw), unless otherwise specified, is the molecular weight determined by a gel permeation chromatography (GPC) analyzer with TSKgel GMHxL, TSKgel G4000HxL, and TSKgel G2000HxL columns (trade names, all available from Tosoh Corporation). The solvent is tetrahydrofuran (THF). A differential refractometer is used for detection. Polystyrene standards are used for calibration.

Ink Jet Recording Method

An ink jet recording method according to the present disclosure includes the steps of ejecting an active-radiation-curable ink composition onto a recording medium by an ink jet process and curing the ejected ink composition by irradiation with active radiation. During transporting of the recording medium in the ejecting and curing steps, an unwinding stress in the recording medium is larger than a winding stress in the recording medium. The recording medium has a thickness of 10 μm to 100 μm.

In addition, printed matter according to the present disclosure is obtained by the ink jet recording method according to the present disclosure.

One problem with known ink jet recording methods is that the adhesiveness between a recording medium having a thickness of 10 μm to 100 μm and a cured film of an ink composition may be insufficient.

After conducting thorough research, the inventors have found that high adhesiveness can be achieved between a recording medium having a thickness of 10 μm to 100 μm and a cured film of an ink composition if the recording medium is transported such that the unwinding stress in the recording medium is larger than the winding stress in the recording medium.

Although the detailed mechanism is not fully understood, it is believed that, if a recording medium is transported during the ejection by an ink jet process and curing of an ink composition such that the unwinding stress in the recording medium is larger than the winding stress in the recording medium, the decrease in the adhesiveness between the ink composition and the recording medium due to curing shrinkage is reduced, thus providing printed matter with high adhesiveness between a cured film of an ink composition and a recording medium.

In the ink jet recording method according to the present disclosure, during transporting of the recording medium in the ejecting and curing steps, an unwinding stress in the recording medium is larger than a winding stress in the recording medium.

The unwinding stress and the winding stress in the recording medium in the present disclosure are measured by the following method.

Method for Measuring Unwinding Stress and Winding Stress in Recording Medium

The unwinding stress and the winding stress in the recording medium are determined with the following measuring instrument.

In the measurement method, the tension is measured with LE-30CTN tensiometers available from Mitsubishi Electric Corporation, one attached between an unwinding roller and ink-composition ejecting means and the other attached between a winding roller and exposure means.

The tension, which is measured in N/m, is divided by the substrate width (m). The calculated value is used as the unwinding or winding stress (Pa).

One example is given below.

If the tensiometer value is 50 N/m and the substrate width is 0.5 m, the unwinding or winding stress is calculated by dividing 50 N/m by 0.5 m, i.e., 100 Pa (=100 N/m$^2$).

Unwinding Stress and Winding Stress in Recording Medium

Examples of methods for adjusting the unwinding stress and the winding stress in the recording medium in the ink jet recording method according to the present disclosure include, but not limited to, the use of recording-medium unwinding and winding rollers with different diameters, the adjustment of the unwinding torque on the recording-medium unwinding roller and the winding torque on the recording-medium winding roller, the use of a drive roller or a tension relaxation mechanism on the recording medium transport path to control the stress, and combinations of two or more thereof.

One example method involves the use of an ink jet recording apparatus shown in FIG. 1.

FIG. 1 is a schematic sectional view of an example ink jet recording apparatus suitable for use in the ink jet recording method according to the present disclosure.

In an ink jet recording apparatus 10 shown in FIG. 1, a recording medium 14 is unwound from an unwinding roller 12. The recording medium 14 passes through unwinding-stress measuring means 16, an ink jet ejection and curing unit 18, and winding-stress measuring means 20 and is wound around a winding roller 22.

The unwinding-stress measuring means 16 and the winding-stress measuring means 20 are each composed of three rollers. The tension is measured on the central roller and is used to calculate the unwinding or winding stress in the recording medium.

In the ink jet recording apparatus 10, the unwinding roller 12 and the winding roller 22 are each provided with a rotational-torque adjusting device (not shown) to adjust the unwinding or winding stress in the recording medium. Preferably, the rotational-torque adjusting devices are configured to operate based on the measurement results obtained by the unwinding-stress measuring means 16 and the winding-stress measuring means 20.

The ink jet ejection and curing unit 18 is provided with ink jet ejection means for ink jet ejection of an ink composition and exposure means for curing of the ink composition by irradiation with active radiation.

In the ink jet recording method according to the present disclosure, the winding stress in the recording medium is preferably 5 Pa to 250 Pa, more preferably 10 Pa to 200 Pa, particularly preferably 20 Pa to 160 Pa, from the viewpoint of adhesiveness (between the recording medium and a cured ink film and between the cured ink film and a lamination film), transport accuracy, and suitability for lamination.

In the ink jet recording method according to the present disclosure, the unwinding stress in the recording medium is preferably 60 Pa to 360 Pa, more preferably 90 Pa to 300 Pa, particularly preferably 100 Pa to 270 Pa, from the viewpoint of adhesiveness, transport accuracy, and suitability for lamination.

In the ink jet recording method according to the present disclosure, the value of subtracting the winding stress from the unwinding stress is preferably 1 Pa to 350 Pa, more preferably 30 Pa to 300 Pa, particularly preferably 50 Pa to 250 Pa, from the viewpoint of adhesiveness, transport accuracy, and suitability for lamination.

In the ink jet recording method according to the present disclosure, $F^A$ ((unwinding stress−winding stress)/(volume shrinkage of ink composition after curing)) defined by the following equation is preferably 0.1 to 25, more preferably 2 to 20.5, even more preferably 2 to 17, particularly preferably 5 to 15, from the viewpoint of adhesiveness, transport accuracy, and suitability for lamination.

The volume shrinkage of the ink composition after curing will be described later.

$$F^A = (\text{unwinding stress−winding stress})/(\text{volume shrinkage of ink composition after curing})$$

Recording Medium

The recording medium used in the present disclosure may be any recording medium having a thickness of 10 μm to 100 μm, including paper such as normal uncoated paper and coated paper and various non-absorbing resin materials and resin films formed therefrom for use in so-called soft packaging. In particular, resin films are suitable for use.

Examples of various resin films include polyethylene terephthalate (PET) films, biaxially oriented polystyrene (OPS) films, biaxially oriented polypropylene (OPP) films, biaxially oriented nylon (ONy) films, polyvinyl chloride (PVC) films, polyethylene (PE) films, and cellulose triacetate (TAC) films.

Other resins that can be used as recording medium materials include polycarbonates, acrylic resins, acrylonitrile-butadiene-styrene copolymers (ABS), polyacetals, polyvinyl alcohols (PVA), and rubbers. Metals and glasses can also be used as recording media.

In particular, the recording medium is preferably a resin film containing at least one resin selected from the group consisting of polyolefin resins, polyester resins, and polyamide resins, more preferably a resin film containing at least one resin selected from the group consisting of polyethylene terephthalate, polyethylene, polypropylene, and nylon, particularly preferably a resin film containing at least one resin selected from the group consisting of polyethylene and polypropylene. This results in a higher adhesiveness and suitability for lamination.

The recording medium used in the present disclosure has a thickness of 10 μm to 100 μm. From the viewpoint of adhesiveness, transport accuracy, and suitability for lamination, the recording medium preferably has a thickness of 10 μm to 90 μm, more preferably 20 μm to 80 μm, particularly preferably 30 μm to 70 μm.

If the recording medium has a thickness of 10 μm or more, high transport accuracy and suitability for lamination can be achieved. If the recording medium has a thickness of 100 μm or less, high adhesiveness and suitability for lamination can be achieved.

The thickness of the recording medium may be measured by a known method of measurement. The thickness of the recording medium is measured at five or more points, and the average thereof is calculated and used as the thickness of the recording medium.

Ejecting Step

The ink jet recording method according to the present disclosure includes a step of ejecting an active-radiation-curable ink composition onto a recording medium by an ink jet process.

The details of the active-radiation-curable ink composition used in the present disclosure will be described later.

The ejection of the ink composition in the present disclosure may be performed by any ink jet process, including known ink jet ejection processes.

An example ink jet recording apparatus that can be used in the present disclosure includes an ink supply system, a temperature sensor, and an active radiation source.

The ink supply system is composed of, for example, a stock tank containing an ink composition, a supply pipe, an ink supply tank disposed immediately upstream of an ink jet head, a filter, and a piezoelectric ink jet head. The piezoelectric ink jet head can be driven to eject multisize dots, preferably with volumes of 1 pL to 100 pL (picoliters), more preferably 8 pL to 30 pL, preferably at a resolution of 320×320 dpi to 4,000×4,000 dpi, more preferably 400×400 dpi to 1,600×1,600 dpi, even more preferably 720×720 dpi. As used in the present disclosure, dpi (dot per inch) refers to the number of dots per 2.54 cm.

It is preferred that the ink composition be ejected at constant temperature. Accordingly, it is preferred that the ink jet recording apparatus include means for stabilizing the temperature of the ink composition. The region where constant temperature is maintained may include all of the piping systems and members from the ink tank (or, if present, an intermediate tank) to the nozzle ejection surface. That is, thermal insulation and warming can be performed from the ink supply tank to the ink jet head section.

Temperature control may be performed in any manner. For example, it is preferred to provide a plurality of temperature sensors disposed at different piping positions and control heating depending on the flow rate of the ink composition and the ambient temperature. The temperature sensors can be disposed on the ink supply tank and near the nozzles of the ink jet head. It is also preferred to thermally shield or insulate the main body of the apparatus to avoid the influence of outside air temperature on the head unit to be heated. To shorten the printer startup time required for heating or to reduce the loss of thermal energy, it is preferred to thermally insulate the head unit from other units and to reduce the thermal capacity of the entire heating unit.

The temperature of the ink composition during ejection is preferably maintained as constant as possible. Preferably, the temperature of the ink composition during ejection is controlled within ±5° C. from the set temperature, more preferably within ±2° C. from the set temperature, even more preferably within ±1° C. from the set temperature.

For example, if a color image is formed in the ejecting step, it is preferred to use at least yellow, cyan, magenta, and black ink compositions, more preferably at least white, yellow, cyan, magenta, and black ink compositions.

Light color ink compositions such as light magenta and light cyan ink compositions, special color ink compositions such as orange, green, and violet ink compositions, clear ink compositions, and metallic ink compositions may also be used.

The ink jet recording method according to the present disclosure may include a step of semi-curing the ejected ink composition when an image area is formed. Exposure means used in the curing step described later is suitable for use as exposure means for semi-curing, with light-emitting diodes (LEDs) being more suitable for use. For semi-curing, reference may be made to, for example, JP2008-248070A and JP2009-221416A.

If two or more ink compositions are ejected, the ink jet recording method according to the present disclosure preferably includes a step of, after ejecting one ink composition, semi-curing the ejected ink composition before ejecting another ink composition.

If two or more ink compositions are ejected, it is preferred to eject any ink composition onto a semi-cured ink composition.

Although the ink compositions may be ejected in any order in the ejecting step, the ink compositions are preferably applied to the recording medium in order of increasing lightness. If yellow, cyan, magenta, and black ink compositions are used, the ink compositions are preferably applied to the recording medium in the following order: black→magenta→cyan→yellow. If a white ink composition is used in addition to these ink compositions, the ink compositions are preferably applied to the recording medium in the following order: black→magenta→cyan→yellow→white. Furthermore, the present disclosure is not limited to these ink sets; it is also preferred to use an ink set including a total of at least seven ink compositions including yellow, light cyan, light magenta, cyan, magenta, black, and white ink compositions. In this case, the ink compositions are preferably applied to the recording medium in the following order: black→magenta→cyan→yellow→light magenta→light cyan→white.

Curing Step

The ink jet recording method according to the present disclosure includes a step of curing the ejected ink composition by irradiation with active radiation.

The ink composition cured in the curing step is the ink composition ejected in the ejecting step. The ink composition may be a semi-cured ink composition.

The irradiation with active radiation in the curing step may be performed one or more times, preferably once. In addition, the ejecting step and the curing step may be performed either simultaneously or sequentially.

Next, the irradiation with active radiation will be described.

The ink composition ejected onto the recording medium is cured by irradiation with active radiation. For example, a polymerization initiator present in the ink composition is decomposed by irradiation with active radiation to generate polymerization initiation species such as radicals. These initiation species function to induce and promote the polymerization reaction of a polymerizable compound. During this process, if a sensitizer is present in the ink composition together with the polymerization initiator, the sensitizer in the system is excited by absorbing active radiation and contacts the polymerization initiator to promote the decomposition of the polymerization initiator, which allows for a more sensitive curing reaction.

Examples of active radiation that can be used herein include α-rays, γ-rays, electron beams, X-rays, ultraviolet radiation, visible light, and infrared light. The active radiation preferably has a peak wavelength of, for example, 200 nm to 600 nm, more preferably 300 nm to 450 nm, even more preferably 320 nm to 420 nm, depending on the absorption characteristics of the polymerization initiator and the sensitizer. Particularly preferred active radiation is ultraviolet radiation having a peak wavelength of 340 nm to 400 nm.

The irradiation with active radiation in the curing step is preferably performed at an exposure surface illuminance of 10 mW/cm$^2$ to 4,000 mW/cm$^2$, more preferably 20 mW/cm$^2$ to 2,500 mW/cm$^2$.

Examples of active radiation sources that are typically used include mercury lamps, gas lasers, and solid-state lasers. Mercury lamps and metal halide lamps are widely known as light sources used for the curing of active-radiation-curable ink jet ink compositions. However, mercury-free devices are currently highly desirable from the viewpoint of environmental conservation, and replacement with GaN-based semiconductor ultraviolet light-emitting devices is very useful, both industrially and environmentally. Furthermore, LEDs (UV-LEDs) and LDs (UV-LDs) are promising light sources for photocurable ink jet ink applications because of their small size, long service life, high efficiency, and low cost.

Light-emitting diodes (LEDs) and laser diodes (LDs) can be used as active radiation sources, with LEDs being preferred. In particular, if an ultraviolet radiation source is required, ultraviolet LEDs and ultraviolet LDs can be used. For example, ultraviolet LEDs having main emission spectra at wavelengths between 365 nm and 420 nm are available from Nichia Corporation. If a still shorter wavelength is required, U.S. Pat. No. 6,084,250A discloses LEDs capable of emitting active radiation centered between 300 nm and 370 nm. Other ultraviolet LEDs are also available and can be used for irradiation with radiation in different ultraviolet ranges. Active radiation sources particularly preferred in the present disclosure are UV-LEDs, particularly preferably UV-LEDs having peak wavelengths of 340 nm to 400 nm.

The maximum illuminance of LEDs on recording media is preferably 10 mW/cm$^2$ to 20,000 mW/cm$^2$, more preferably 20 mW/cm$^2$ to 15,000 mW/cm$^2$, particularly preferably 50 mW/cm$^2$ to 10,000 mW/cm$^2$.

In the curing step, it is preferred to irradiate the ink composition with such active radiation for 0.01 seconds to 120 seconds, more preferably 0.1 seconds to 90 seconds.

The conditions and basic method for irradiation with active radiation are disclosed in JP1985-132767A (JP-S60-132767A). Specifically, light sources are mounted on both sides of a head unit including an ink-composition ejecting device, and the head unit and the light sources are scanned by a so-called shuttle system. Irradiation with active radiation is performed after a predetermined period of time (preferably 0.01 seconds to 0.5 seconds, more preferably 0.01 seconds to 0.3 seconds, even preferably 0.01 seconds to 0.15 seconds) elapses from the landing of the ink composition. Thus, the time from the landing of the ink composition to irradiation is very short, which prevents the ink composition landed on the recording medium from bleeding before curing. In addition, even if the recording medium is porous, the ink composition can be exposed before penetrating into a deep part that is not reached by the light source, which is preferred because the amount of residual unreacted monomer can be reduced.

Curing may also be completed with another light source that is not driven. WO99/54415A discloses a method for irradiation with an optical fiber and a method for irradiating a recording area with UV light by directing collimated light onto a mirror surface provided on a side of a head unit. Such curing methods can also be used in the ink jet recording method according to the present disclosure.

In the curing step, the ink composition is preferably cured in an atmosphere with an oxygen partial pressure of 0.15 atm or less, more preferably 0.10 atm or less, particularly preferably 0.05 atm or less. This results in a higher reactivity, suitability for lamination, and adhesion strength between a lamination film and an ink film.

In the present disclosure, 1 atm=1 atmosphere=101,325 Pa.

Active-Radiation-Curable Ink Composition

The active-radiation-curable ink composition used in the ink jet recording method according to the present disclosure (hereinafter also simply referred to as "ink composition"), which is an ink composition that is curable with active radiation, may be any composition containing a polymerizable compound. Preferably, the ink composition contains a polymerizable compound and a photopolymerization initiator.

The ink composition used in the present disclosure is preferably an oil-based ink composition. The ink composition used in the present disclosure preferably contains as little water and volatile solvent as possible. A content of these components, if present, are preferably 5% by mass or less, more preferably 1% by mass or less, even more preferably 0.5% by mass or less, based on the total mass of the ink composition.

The ink composition used in the ink jet recording method according to the present disclosure preferably exhibits a volume shrinkage of 1% to 40%, more preferably 5% to 40%, even more preferably 10% to 35%, particularly preferably 15% to 30%, after curing from the viewpoint of adhesiveness and suitability for lamination.

The volume shrinkage of the ink composition in the present disclosure is determined using a CUSTRON EU201C (available from AcroEdge Corporation). The ink composition is injected into a polytetrafluoroethylene ring for the above device. The ring is set such that a load cell (stress-measuring means) contacts the surface of the injected ink composition. The ink composition is exposed to ultraviolet (UV) light at 100 mW/cm$^2$ in air at 1 atmosphere for 1 second. The amount of shrinkage of the cured product is measured and used to calculate the volume shrinkage of the ink composition.

Polymerizable Compound

The ink composition used in the present disclosure contains a polymerizable compound.

The polymerizable compound may be any compound, including monomers, oligomers, and polymers, that undergoes a polymerization reaction and thereby cures when given some energy. Particularly preferred are various polymerizable monomers known as radically polymerizable monomers, which undergo polymerization reactions in the presence of initiation species generated from polymerization initiators added as desired.

The polymerizable compound is preferably an ethylenically unsaturated compound.

A single polymerizable compound or a mixture of a plurality of polymerizable compounds can be used in order to adjust, for example, the reaction rate, the properties of the cured film, and the properties of the composition. The polymerizable compound may be either a monofunctional compound or a polyfunctional compound. A higher proportion of monofunctional polymerizable compounds tends to result in a higher flexibility of the cured product, whereas a higher proportion of polyfunctional polymerizable compounds tends to result in a higher curability. Thus, the proportions of monofunctional and polyfunctional polymerizable compounds are determined as appropriate depending on the use.

From the viewpoint of adhesiveness, transport accuracy, and suitability for lamination, the ink composition used in the present disclosure preferably contains a di- or higher-functional polymerizable compound.

From the viewpoint of adhesiveness, transport accuracy, and suitability for lamination, the ink composition used in the present disclosure preferably contains a di- or higher-functional polymerizable compound in an amount of 50% by mass or more, more preferably 65% by mass or more, particularly preferably 75% by mass or more, based on the total mass of the ink composition.

From the viewpoint of adhesiveness, transport accuracy, and suitability for lamination, the ink composition used in the present disclosure preferably contains a di- or higher-functional polymerizable compound in an amount of 60 parts by mass or more, more preferably 80 parts by mass or more, even more preferably 90 parts by mass or more, particularly preferably 95 parts by mass or more, based on 100 parts by mass of all polymerizable compounds present in the ink composition.

Preferred polymerizable compounds that can be used include various known radically polymerizable compounds that undergo polymerization reactions in the presence of initiation species generated from radical initiators.

Examples of radically polymerizable compounds include (meth)acrylates, (meth)acrylamides, and aromatic vinyl compounds.

Examples of (meth)acrylates that can be used as radically polymerizable compounds include monofunctional (meth) acrylates, difunctional (meth)acrylates, trifunctional (meth) acrylates, tetrafunctional (meth)acrylates, pentafunctional (meth)acrylates, and hexafunctional (meth)acrylates.

Examples of monofunctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butyl cyclohexyl (meth)acrylate, bornyl (meth)acrylate, isobornyl (meth)acrylate, benzyl (meth)acrylate, 2-ethyl hexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth) acrylate, 3-methoxybutyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, and 2-hydroxybutyl (meth) acrylate.

Other examples include 4-hydroxybutyl (meth)acrylate, 3-hydroxybutyl (meth)acrylate, dimethylaminoethyl (meth) acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxyethylsuccinic acid, 2-methacryloyloxyhexahydrophthalic acid, 2-methacryloyloxyethyl-2-hydroxypropylphthalate, butoxydiethylene glycol (meth)acrylate, trifluoroethyl (meth)acrylate, perfluorooctylethyl (meth)acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified 2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, and phenoxyethylene glycol (meth)acrylate.

Examples of difunctional (meth)acrylates include 1,6-hexanediol di(meth)acrylate, 1,10-decanediol di(meth)acrylate, neopentyl glycol di(meth)acrylate, 2,4-dimethyl-1,5-pentanediol di(meth)acrylate, 3-methyl-1,5-pentanediol di(meth)acrylate, butylethylpropanediol di(meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butylbutanediol di(meth)acrylate, neopentyl glycol hydroxypivalate di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, dipropylene glycol di(meth)acrylate, tripropylene glycol di(meth) acrylate, and PO-modified neopentyl glycol di(meth)acrylate.

Examples of trifunctional (meth)acrylates include trimethylolpropane tri(meth)acrylate, trimethylolethane tri(meth)acrylate, alkylene-oxide-modified trimethylolpropane tri(meth)acrylate, pentaerythritol tri(meth)acrylate, dipentaerythritol tri(meth)acrylate, trimethylolpropane tri((meth) acryloyloxypropyl) ether, alkylene-oxide-modified isocyanurate tri(meth)acrylate, dipentaerythritol propionate tri (meth)acrylate, tri((meth)acryloyloxyethyl) isocyanurate, hydroxypivalaldehyde-modified dimethylolpropane tri (meth)acrylate, sorbitol tri(meth)acrylate, propoxylated trimethylolpropane tri(meth)acrylate, and ethoxylated glycerol triacrylate.

Examples of tetrafunctional (meth)acrylates include pentaerythritol tetra(meth)acrylate, sorbitol tetra(meth)acrylate, ditrimethylolpropane tetra(meth)acrylate, dipentaerythritol propionate tetra(meth)acrylate, and ethoxylated pentaerythritol tetra(meth)acrylate.

Examples of pentafunctional (meth)acrylates include sorbitol penta(meth)acrylate and dipentaerythritol penta(meth) acrylate.

Examples of hexafunctional (meth)acrylates include dipentaerythritol hexa(meth)acrylate, sorbitol hexa(meth) acrylate, alkylene-oxide-modified phosphazene hexa(meth) acrylate, and ε-caprolactone-modified dipentaerythritol hexa (meth)acrylate.

Examples of (meth)acrylamides that can be used as radically polymerizable compounds include (meth)acrylamide, N-methyl(meth)acryl amide, N-ethyl(meth)acrylamide, N-propyl(meth)acrylamide, N-n-butyl (meth)acrylamide, N-t-butyl (meth)acryl amide, N-butoxymethyl(meth)acrylamide, N-isopropyl(meth)acrylamide, N-methylol(meth) acrylamide, N,N-dimethyl(meth)acrylamide, N,N-diethyl (meth)acrylamide, and (meth)acryloylmorpholine.

Examples of aromatic vinyl compounds that can be used as radically polymerizable compounds include styrene, dimethyl styrene, trimethylstyrene, isopropyl styrene, chloromethylstyrene, methoxystyrene, acetoxystyrene, chlorostyrene, dichlorostyrene, bromostyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, and 4-t-butoxystyrene.

Further examples of radically polymerizable compounds that can be used in the present disclosure include vinyl esters (e.g., vinyl acetate, vinyl propionate, and vinyl versatate), allyl esters (e.g., allyl acetate), halogen-containing monomers (e.g., vinylidene chloride and vinyl chloride), vinyl ethers (e.g., methyl vinyl ether, butyl vinyl ether, hexyl vinyl ether, methoxy vinyl ether, 2-ethylhexyl vinyl ether, methoxyethyl vinyl ether, cyclohexyl vinyl ether, chloroethyl vinyl ether, and triethylene glycol divinyl ether), vinyl cyanides (e.g., (meth)acrylonitrile), olefins (e.g., ethylene and propylene), and N-vinyl lactams (e.g., N-vinylcaprolactam).

More specifically, commercially available compounds such as those described in S. Yamashita, ed. "Crosslinking Agent Handbook" (Taiseisha Ltd., 1981); K. Kato, ed. "UV•EB Curing Handbook (Material Section)" (Kobunshi Kankokai, 1985); RadTech Japan, ed. "Application and Market of UV•EB Curing Technology", p. 79 (CMC Publishing Co., Ltd., 1989); E. Takiyama "Polyester Resin Handbook" (Nikkan Kogyo Shimbun, Ltd., 1988) as well as radically polymerizable or crosslinkable monomers, oligomers, and polymers known in the art can be used.

It is particularly preferred to use at least one polymerizable compound selected from the group consisting of (meth) acrylates, (meth)acrylamides, and aromatic vinyl compounds.

These polymerizable compounds can be used alone or in a combination of two or more thereof.

From the viewpoint of curability, depending on the use, a content of the polymerizable compound in the ink composition according to the present disclosure is preferably 10% by mass to 95% by mass, more preferably 20% by mass to 90% by mass, based on the total mass of the ink composition.

Photopolymerization Initiator

The ink composition that can be used in the present disclosure preferably contains a photopolymerization initiator.

The photopolymerization initiator is preferably a radical photopolymerization initiator.

Examples of photopolymerization initiators include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds. These radical polymerization initiators, i.e., the compounds (a) to (m) above, may be used alone or in combination. Specific examples of polymerization initiators include those described in paragraphs 0090 to 0116 of JP2009-185186A.

These photopolymerization initiators may be used alone or in a combination of two or more thereof in the present disclosure.

Preferred photopolymerization initiators include acylphosphine compounds, α-hydroxy ketone compounds, and/or α-amino ketone compounds. In particular, acylphosphine compounds and/or α-amino ketone compounds are more preferred, with acylphosphine compounds being even more preferred.

Examples of suitable acylphosphine compounds include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, bis(2,6-dimethoxybenzoyl)-2,4,4-trimethylpentylphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, 2,4,6-trimethylbenzoyldiphenylphosphine oxide (LUCIRIN TPO, available from BASF), 2,6-dimethylbenzoylmethoxyphenylphosphine oxide, 2,4,6-trimethylbenzoyl (4-pentyl oxyphenyl)phenylphosphine oxide, and 2,6-dimethylbenzoyl(4-pentyloxyphenyl)phenylphosphine oxide.

Preferred of these acylphosphine oxide compounds are bis(2,4,6-trimethylbenzoyl)phenylphosphine oxide (IRGACURE 819, available from BASF) and bis(2,6-dimethoxybenzoyl)-2,4,4-trimethylpentylphenylphosphine oxide, particularly preferably bis(2,4,6-trimethylbenzoyl)phenylphosphine oxide.

Another example of an acylphosphine oxide compound is IRGACURE TPO available from BASF.

From the viewpoint of curability, aromatic ketones are preferred as polymerization initiators.

Preferred aromatic ketones include α-hydroxy ketone compounds and/or α-amino ketone compounds.

Examples of α-hydroxy ketone compounds that can be used include known compounds such as 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone. Particularly preferred are 1-hydroxycyclohexyl phenyl ketone compounds. In the present disclosure, 1-hydroxycyclohexyl phenyl ketone compounds include 1-hydroxycyclohexyl phenyl ketones substituted by any substituent. Any substituent can be selected, provided that the compound can deliver its function as a radical polymerization initiator. Specific examples include alkyl groups having 1 to 4 carbon atoms.

Examples of α-amino ketone compounds that can be used include known compounds such as 2-methyl-1-phenyl-2-morpholinopropan-1-one, 2-methyl-1-[4-(hexyl)phenyl]-2-morpholinopropan-1-one, 2-ethyl-2-dimethylamino-1-(4-morpholinophenyl)butan-1-one, 2-benzyl-2-dimethylamino-1-(4-morpholinophenyl)-butan-1-one, and 2-dimethylamino-2-(4-methylbenzyl)-1-(4-morpholin-4-ylphenyl)-butan-1-one. Preferred examples of commercially available compounds include IRGACURE 907 (2-methyl-1-(4-methylthiophenyl)-2-morpholinopropan-1-one), IRGACURE 369 (2-benzyl-2-dimethylamino-1-(4-morpholinophenyl)-1-butanone), and IRGACURE 379 (2-(dimethylamino)-2-[(4-methylphenyl)methyl]-1-[4-(4-morpholinyl)phenyl]-1-butanone) available from BASF.

The ink composition that can be used in the present disclosure preferably contains, as a photopolymerization initiator, at least a compound represented by formula (1) or (2) below. The use of a compound represented by formula (1) or (2) provides an ink jet ink composition with high curability and blocking resistance that allows little film component to leach out (migrate) and thus leaves less odor on printed matter.

From the viewpoint of curability and adhesiveness, the ink composition that can be used in the present disclosure preferably contains, as a photopolymerization initiator, at least a compound selected from the group consisting of acylphosphine compounds, compounds represented by formula (1) below, and compounds represented by formula (2) below.

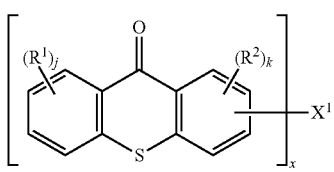

(1)

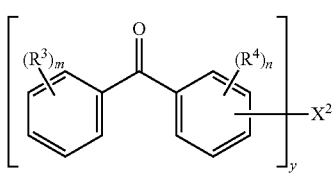

(2)

In formulae (1) and (2), $R^1$, $R^2$, $R^3$, and $R^4$ each independently represent an alkyl group having 1 to 5 carbon atoms or a halogen atom; x and y each independently represent an integer of 2 to 4; j and m each independently represent an integer of 0 to 4; k and n each independently represent an integer of 0 to 3; if j, k, m, or n represents an integer of 2 or more, the plurality of $R^1$'s $R^2$'s, $R^3$'s, or $R^4$'s may be the same or different; $X^1$ represents an x-functional linking group containing at least one of a hydrocarbon chain, an ether linkage, or an ester linkage; and $X^2$ represents a y-functional linking group containing at least one of a hydrocarbon chain, an ether linkage, or an ester linkage.

The ink composition preferably contains a compound represented by formula (1) as a photopolymerization initiator.

For preferred forms and specific examples of compounds represented by formula (1), reference may be made to those described in paragraphs 0035 to 0053 of JP2014-162828A.

As compounds represented by formula (1), commercially available compounds can also be used. Specific examples include SPEEDCURE 7010 (1,3-di({α-[1-chloro-9-oxo-9H-thioxanthen-4-yl]oxy}acetylpoly[oxy(1-methylethylene)]oxy)-2,2-bis({α-[1-chloro-9-oxo-9H-thioxanthen-4-yl]oxy}acetylpoly[oxy(1-methylethylene)]oxymethyl)propane, CAS No. 1003567-83-6) and OMNIPOL TX (polybutylene glycol bis(9-oxo-9H-thioxanthenyloxy)acetate, CAS No. 813452-37-8).

The ink composition also preferably contains a compound represented by formula (2) as a polymerization initiator.

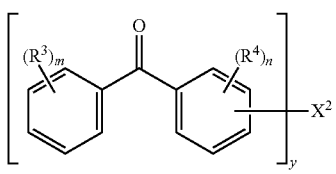

(2)

In formula (2), $R^3$ and $R^4$ each independently represent an alkyl group having 1 to 5 carbon atoms or a halogen atom; m represents an integer of 0 to 4; n represents an integer of 0 to 3; y represents an integer of 2 to 4; if m or n represents an integer of 2 or more, the plurality of $R^3$'s or $R^4$'s may be the same or different; and $X^2$ represents a y-functional linking group having at least one of a hydrocarbon chain, an ether linkage, or an ester linkage.

For preferred forms and specific examples of compounds represented by formula (2), reference may be made to those described in paragraphs 0054 to 0075 of JP2014-162828A.

As compounds represented by formula (2), commercially available compounds can also be used. Specific examples include OMNIPOL BP (polybutylene glycol bis(4-benzoylphenoxy)acetate, CAS No. 515136-48-8).

A content of the compound represented by formula (1) or (2) is preferably 0.01% by mass to 10% by mass, more preferably 0.05% by mass to 8.0% by mass, even more preferably 0.1% by mass to 5.0% by mass, particularly preferably 0.1% by mass to 2.4% by mass, based on the total mass of the ink composition. This results in high curability.

The ink composition preferably further contains, as a polymerization initiator, a compound that functions as a sensitizer (hereinafter also simply referred to as "sensitizer") to absorb particular active radiation and thereby promote the decomposition of the polymerization initiator.

Examples of sensitizers include polynuclear aromatic compounds (e.g., pyrene, perylene, triphenylene, and 2-ethyl-9,10-dimethoxyanthracene), xanthenes (e.g., fluorescein, eosin, erythrosine, Rhodamine B, and rose bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavin, and acriflavine), anthraquinones (e.g., anthraquinone), squaryliums (e.g., squarylium), coumarins (e.g., 7-diethylamino-4-methylcoumarin), thioxanthones (e.g., isopropylthioxanthone), and thiochromanones (e.g., thiochromanone).

In particular, thioxanthones are preferred as sensitizers, with isopropylthioxanthone being more preferred.

These sensitizers may be used alone or in a combination of two or more thereof.

A total content of the polymerization initiator is preferably 1.0% by mass to 15.0% by mass, more preferably 1.5% by mass to 10.0% by mass, even more preferably 3.0% by mass to 8.0% by mass, based on the total mass of the ink composition. This results in high curability.

Colorant

The ink composition that can be used in the present disclosure preferably contains a colorant.

Preferred colorants include, but not limited to, pigments and oil-based dyes, which have high weather resistance and good color reproducibility. Any colorant can be selected and used from known colorants, including soluble dyes. To avoid a decrease in the sensitivity of the curing reaction with active radiation, it is preferred to select, as the colorant, a compound that does not function as a polymerization inhibitor.

The pigment may be any pigment selected as appropriate depending on the purpose, including known organic pigments and inorganic pigments. Other pigments include resin particles stained with dyes and commercially available pigment dispersions and surface-treated pigments (e.g., dispersions of pigments in dispersion media, such as resins, in which the pigments are insoluble and pigments having resins grafted to the surface thereof). Examples of such pigments include those described in S. Ito, ed. "Encyclopedia of Pigments" (2000), W. Herbst, K. Hunger "Industrial Organic Pigments", JP2002-12607A, JP2002-188025A, JP2003-26978A, and JP2003-342503A.

Examples of organic and inorganic pigments include yellow pigments, magenta pigments, blue or cyan pigments, green pigments, orange pigments, brown pigments, violet pigments, black pigments, and white pigments.

Yellow pigments are pigments that appear yellow. Examples of yellow pigments include monoazo pigments such as C.I. Pigment Yellow 1 (e.g., Fast Yellow G) and C.I. Pigment Yellow 74; disazo pigments such as C.I. Pigment Yellow 12 (e.g., disazo yellow), C.I. Pigment Yellow 17, C.I. Pigment Yellow 97, C.I. Pigment Yellow 3, C.I. Pigment Yellow 16, C.I. Pigment Yellow 83, C.I. Pigment Yellow 155, and C.I. Pigment Yellow 219; non-benzidine azo pigments such as C.I. Pigment Yellow 180; azo lake pigments such as C.I. Pigment Yellow 100 (e.g., tartrazine yellow lake); condensed azo pigments such as C.I. Pigment Yellow 95 (e.g., condensed azo yellow), C.I. Pigment Yellow 93, C.I. Pigment Yellow 94, C.I. Pigment Yellow 128, and C.I. Pigment Yellow 166; acid dye lake pigments such as C.I. Pigment Yellow 115 (e.g., quinoline yellow lake); basic dye lake pigments such as C.I. Pigment Yellow 18 (e.g., thioflavine lake); anthraquinone pigments such as C.I. Pigment Yellow 24 (e.g., flavanthrone yellow); quinophthalone pigments such as C.I. Pigment Yellow 110 (e.g., quinophthalone yellow); isoindoline pigments such as C.I. Pigment Yellow 139 (e.g., isoindoline yellow); pyrazolone pigments such as C.I. Pigment Yellow 60 (e.g., pyrazolone yellow); acetolone pigments such as C.I. Pigment Yellow 120, C.I. Pigment Yellow 154, C.I. Pigment Yellow 167, C.I. Pigment Yellow 151, C.I. Pigment Yellow 175, C.I. Pigment Yellow 180, C.I. Pigment Yellow 181, C.I. Pigment Yellow 185, and C.I. Pigment Yellow 194; metal complex salt pigments such as C.I. Pigment Yellow 150; nitroso pigments such as C.I. Pigment Yellow 153 (e.g., nickel nitroso yellow); and metal complex salt azomethine pigments such as C.I. Pigment Yellow 117 (e.g., copper azomethine yellow).

Magenta pigments are pigments that appear red or magenta. Examples of magenta pigments include monoazo pigments such as C.I. Pigment Red 3 (e.g., toluidine red); B-naphthol pigments such as C.I. Pigment Red 1, C.I. Pigment Red 4, and C.I. Pigment Red 6; disazo pigments such as C.I. Pigment Red 38 (e.g., Pyrazolone Red B); azo lake pigments such as C.I. Pigment Red 53:1 (e.g., Lake Red C), C.I. Pigment Red 57:1 (e.g., Brilliant Carmine 6B), C.I. Pigment Red 52:1, and C.I. Pigment Red 48 (e.g., B-oxynaphthoic acid lake); condensed azo pigments such as C.I. Pigment Red 144, C.I. Pigment Red 166, C.I. Pigment Red 220, C.I. Pigment Red 214, C.I. Pigment Red 221, and C.I. Pigment Red 242 (e.g., condensed azo red); acid dye lake pigments such as C.I. Pigment Red 174 (e.g., Phloxine B Lake) and C.I. Pigment Red 172 (e.g., erythrosine lake); basic dye lake pigments such as C.I. Pigment Red 81 (e.g., Rhodamine 6G' Lake); anthraquinone pigments such as C.I. Pigment Red 177 (e.g., dianthraquinonyl red); thioindigo pigments such as C.I. Pigment Red 88 (e.g., thioindigo bordeaux); perinone pigments such as C.I. Pigment Red 194 (e.g., perinone red); perylene pigments such as C.I. Pigment Red 149, C.I. Pigment Red 179, C.I. Pigment Red 178, C.I. Pigment Red 190, C.I. Pigment Red 224, and C.I. Pigment Red 123; quinacridone pigments such as C.I. Pigment Violet 19 (unsubstituted quinacridone), C.I. Pigment Red 122, C.I. Pigment Red 262, C.I. Pigment Red 207, and C.I. Pigment Red 209; isoindolinone pigments such as C.I. Pigment Red 180 (e.g., Isoindolinone Red 2BLT); alizarin lake pigments such as C.I. Pigment Red 83 (e.g., madder lake); naphtholone pigments such as C.I. Pigment Red 171, C.I. Pigment Red 175, C.I. Pigment Red 176, C.I. Pigment Red 185, and C.I. Pigment Red 208; Naphthol AS lake pigments such as C.I. Pigment Red 247; Naphthol AS pigments such as C.I. Pigment Red 2, C.I. Pigment Red 5, C.I. Pigment Red 21, C.I. Pigment Red 170, C.I. Pigment Red 187, C.I. Pigment Red 256, C.I. Pigment Red 268, and C.I. Pigment Red 269; and diketopyrrolopyrrole pigments such as C.I. Pigment Red 254, C.I. Pigment Red 255, C.I. Pigment Red 264, and C.I. Pigment Red 272.

Cyan pigments are pigments that appear blue or cyan. Examples of cyan pigments include disazo pigments such as C.I. Pigment Blue 25 (e.g., dianisidine blue); phthalocyanine pigments such as C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, and C.I. Pigment Blue 16 (e.g., phthalocyanine blue); acid dye lake pigments such as C.I. Pigment Blue 24 (e.g., peacock blue lake); basic dye lake pigments such as C.I. Pigment Blue 1 (e.g., Victoria Pure Blue BO lake); anthraquinone pigments such as C.I. Pigment Blue 60 (e.g., indanthrone blue); and alkali blue pigments such as C.I. Pigment Blue 18 (Alkali Blue V-5:1).

Green pigments are pigments that appear green. Examples of green pigments include phthalocyanine pigments such as C.I. Pigment Green 7 (phthalocyanine green) and C.I. Pigment Green 36 (phthalocyanine green); and azo metal complex pigments such as C.I. Pigment Green 8 and C.I. Pigment Green 10.

Orange pigments are pigments that appear orange. Examples of orange pigments include isoindoline pigments such as C.I. Pigment Orange 66 (isoindoline orange); anthraquinone pigments such as C.I. Pigment Orange 51 (dichloropyranthrone orange); B-naphthol pigments such as C.I. Pigment Orange 2, C.I. Pigment Orange 3, and C.I. Pigment Orange 5; Naphthol AS pigments such as C.I. Pigment Orange 4, C.I. Pigment Orange 22, C.I. Pigment Orange 24, C.I. Pigment Orange 38, and C.I. Pigment Orange 74; isoindolinone pigments such as C.I. Pigment Orange 61; perinone pigments such as C.I. Pigment Orange 43; disazo pigments such as C.I. Pigment Orange 15 and C.I. Pigment Orange 16; quinacridone pigments such as C.I. Pigment Orange 48 and C.I. Pigment Orange 49; acetolone pigments such as C.I. Pigment Orange 36, C.I. Pigment Orange 62, C.I. Pigment Orange 60, C.I. Pigment Orange 64, and C.I. Pigment Orange 72; and pyrazolone pigments such as C.I. Pigment Orange 13 and C.I. Pigment Orange 34.

Brown pigments are pigments that appear brown. Examples of brown pigments include naphtholone pigments such as C.I. Pigment Brown 25 and C.I. Pigment Brown 32.

Violet pigments are pigments that appear violet. Examples of violet pigments include naphtholone pigments such as C.I. Pigment Violet 32; perylene pigments such as C.I. Pigment Violet 29; Naphthol AS pigments such as C.I. Pigment Violet 13, C.I. Pigment Violet 17, and C.I. Pigment Violet 50; and dioxazine pigments such as C.I. Pigment Violet 23 and C.I. Pigment Violet 37.

Black pigments are pigments that appear black. Examples of black pigments include carbon black such as MOGUL E; titanium black; indazine pigments such as C.I. Pigment Black 1 (aniline black); and perylene pigments such as C.I. Pigment Black 31 and C.I. Pigment Black 32.

Examples of white pigments include basic lead carbonate ($2PbCO_3Pb(OH)_2$, i.e., silver white), zinc oxide (ZnO, i.e., zinc white), titanium oxide ($TiO_2$, i.e., titanium white), and strontium titanate ($SrTiO_3$, i.e., titanium strontium white). Inorganic particles used as white pigments may be either simple particles or composite particles with, for example, oxides of metals such as silicon, aluminum, zirconium, and titanium, organometallic compounds, and organic compounds.

In particular, titanium oxide is suitable for use since it has a lower specific gravity than other white pigments, has high hiding and coloring power as a pigment because of its high refractive index and high chemical and physical stability, and has high resistance to acidic, alkaline, and other environments. Titanium oxide may be used in combination with other white pigments (including white pigments other than those listed above).

Examples of suitable dispersers that can be used to disperse the pigment include ball mills, sand mills, attritors, roller mills, jet mills, homogenizers, paint shakers, kneaders, agitators, Henschel mixers, colloid mills, ultrasonic homogenizers, pearl mills, and wet jet mills.

In the present disclosure, it is particularly preferred to add a dispersing agent described later when the pigment is dispersed.

In addition, a synergist serving as a dispersing aid may optionally be added depending on the type of pigment when the pigment is dispersed. A content of the dispersing aid in the ink composition is preferably 1 to 50 parts by mass based on 100 parts by mass of the pigment.

The dispersion medium used to disperse the pigment in the ink composition may be any dispersion medium selected as appropriate depending on the purpose. For example, the low-molecular-weight polymerizable compounds listed above may be used as the dispersion medium. Alternatively, solvents may be used as the dispersion medium. However, the ink composition according to the present disclosure, which is an active-radiation-curable ink composition and is, for example, applied to and cured on recording media, preferably contains no solvent, i.e., solvent-free. This is because any solvent remaining in the cured product would degrade the solvent resistance and would also cause the problem of volatile organic compounds (VOCs). Thus, the polymerizable compounds listed above are preferred for use as the dispersion medium. Of these, polymerizable compounds with the lowest viscosities are preferably selected to improve the suitability for dispersion and the handleability of the ink composition.

Although the pigment may have any average particle size selected as appropriate depending on the purpose, finer pigments provide better color development properties. Preferably, the pigment has an average particle size of about 0.01 μm to about 0.4 μm, more preferably 0.02 μm to 0.2 μm. The pigment preferably has a maximum particle size of 3 μm or less, more preferably 1 μm or less. The particle size of the pigment can be adjusted, for example, by selecting the pigment, the dispersing agent, and the dispersion medium and setting the dispersion conditions and the filtration conditions. By controlling the particle size of the pigment, the clogging of head nozzles can be inhibited, and the preservation stability, transparency, and curing sensitivity of the ink can be maintained.

The particle size of the pigment can be measured by a known method of measurement. Specifically, the particle size can be measured by centrifugal sedimentation light transmission, X-ray transmission, laser diffraction scattering, or dynamic light scattering.

These colorants may be used alone or in a combination of two or more thereof.

The amount of colorant present in the ink composition may be selected as appropriate depending on the color and the intended use. Preferably, a content of the colorant is 0.01% by mass to 30% by mass based on the total mass of the ink composition.

Dispersing Agent

The ink composition used in the present disclosure may contain a dispersing agent. In particular, if a pigment is used, the ink composition used in the present disclosure preferably contains a dispersing agent so that the pigment can be stably dispersed therein. The dispersing agent is preferably a high-molecular-weight dispersant. In the present disclosure, "high-molecular-weight dispersant" refers to a dispersing agent having a weight average molecular weight of 1,000 or more.

Examples of high-molecular-weight dispersants include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (available from BYK Chemie); EFKA 4010, EFKA 4046, EFKA 4080, EFKA 5010, EFKA 5207, EFKA 5244, EFKA 6745, EFKA 6750, EFKA 7414, EFKA 745, EFKA 7462, EFKA 7500, EFKA 7570, EFKA 7575, EFKA 7580, and EFKA 7701 (available from EFKA additives); DISPERSE AID 6, DISPERSE AID 8, DISPERSE AID 15, and DISPERSE AID 9100 (available from San Nopco Limited); various SOLSPERSE dispersing agents such as SOLSPERSE 3000, 5000, 9000, 12000, 13240, 13940, 17000, 22000, 24000, 26000, 28000, 32000, 36000, 39000, 41000, and 71000 (available from Noveon); ADEKA PLURONIC L31, F38, L42, L44, L61, L64, F68, L72, P95, F77, P84, F87, P94, L101, P103, F108, L121, and P-123 (available from ADEKA Corporation); IONET S-20 (available from Sanyo Chemical Industries, Ltd.); DISPARLON KS-860, 873 SN, and 874 (high-molecular-weight dispersant); and #2150 (aliphatic polycarboxylic acid) and #7004 (polyether-ester type) (available from Kusumoto Chemicals, Ltd.).

The amount of dispersing agent present in the ink composition may be selected as appropriate depending on the intended use. Preferably, a content of the dispersing agent is 0.05% by mass to 15% by mass based on the total mass of the ink composition.

Surfactant

The ink composition used in the present disclosure may contain a surfactant.

Surfactants that can be used include those described in JP1987-173463A (JP-S62-173463A) and JP1987-183457A (JP-S62-183457A). Examples of surfactants include anionic surfactants such as dialkyl sulfosuccinate salts, alkyl naphthalenesulfonate salts, and fatty acid salts; nonionic surfactants such as polyoxyethylene alkyl ethers, polyoxyethylene alkylaryl ethers, acetylene glycols, and polyoxyethylene-polyoxypropylene block copolymers; and cationic surfactants such as alkylamine salts and quaternary ammonium salts. The surfactant may also be a fluorine-containing surfactant (e.g., an organic fluoro compound) or a silicone surfactant (e.g., a polysiloxane compound). The organic fluoro compound is preferably hydrophobic. Examples of organic fluoro compounds include fluorine-containing surfactants, oily fluorine-containing compounds (e.g., fluorinated oil), and solid fluorine-containing compound resins (e.g., tetrafluoroethylene resin), such as those described in JP1982-9053B (JP-S57-9053B) (columns 8 to 17) and JP1987-135826A (JP-S62-135826A). The polysiloxane compound is preferably a modified polysiloxane compound in which organic groups are introduced to some of the methyl groups of the dimethylpolysiloxane. Examples of modifications include, but not limited to, polyether modifications, methylstyrene modifications, alcohol modifications, alkyl modifications, aralkyl modifications, fatty acid ester modifications, epoxy modifications, amine modifications, amino modifications, and mercapto modifications. These modifications may also be used in combination. In particular, polyether-modified polysiloxane compounds are preferred to improve the ink jet ejection stability. Examples of polyether-modified polysiloxane compounds include SILWET L-7604, SILWET L-7607N, SILWET FZ-2104, and SILWET FZ-2161 (available from NUC Corporation); BYK-306, BYK-307, BYK-331, BYK-333, BYK-347, and BYK-348 (available from BYK Chemie); and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (available from Shin-Etsu Chemical Co., Ltd.).

Of these, silicone surfactants are preferred.

The amount of surfactant present in the ink composition used in the present disclosure may be selected as appropriate depending on the intended use. Preferably, a content of the surfactant is 0.0001% by mass to 1% by mass based on the total mass of the ink composition.

Polymerization Inhibitor

To improve the storage stability and to inhibit head clogging, the ink composition used in the present disclosure may contain a polymerization inhibitor.

Examples of polymerization inhibitors include nitroso polymerization inhibitors, hindered amine polymerization inhibitors, hindered phenol polymerization inhibitors, hydroquinone, benzoquinone, p-methoxyphenol, 2,2,6,6-tetramethylpiperidin-1-oxyl (TEMPO), 4-hydroxy-2,2,6,6-tetramethylpiperidin-1-oxyl (TEMPOL), and N-nitroso-N-phenylhydroxylamine aluminum salt (Cupferron Al).

These polymerization inhibitors may be used alone or in a combination of two or more thereof.

A content of the polymerization inhibitor is preferably 0.001% by mass to 2% by mass, more preferably 0.01% by mass to 1% by mass, particularly preferably 0.02% by mass to 0.8% by mass, based on the total mass of the ink composition.

Solvent

The ink composition used in the present disclosure may contain a solvent.

Examples of solvents include ketone solvents such as acetone, methyl ethyl ketone, and diethyl ketone; alcohol solvents such as methanol, ethanol, 2-propanol, 1-propanol, 1-butanol, and tert-butanol; chlorine-containing solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; glycol ether solvents such as ethylene glycol monomethyl ether, ethylene glycol dimethyl ether, and tripropylene glycol monomethyl ether; cyclic ester solvents such as γ-butyrolactone; and amide solvents such as 2-methylpyrrolidone and 2-pyrrolidone.

In this case, it is effective to add the solvent so as not to cause a problem with solvent resistance or VOCs. Preferably, a content of the solvent is 0.1% by mass to 5% by mass, more preferably 0.1% by mass to 3% by mass, based on the total mass of the ink composition.

The solvent may be added to the ink composition as the dispersion medium for the various components such as the pigment. Alternatively, the ink composition may be solvent-free, and the polymerizable compound may be used as the dispersion medium. Preferably, the ink composition is solvent-free.

Other Additives

The ink composition used in the present disclosure may contain other additives, depending on the use.

Other additives that can be used include various known additives.

Examples of other additives that can be present include alkali-soluble resins, co-sensitizers, ultraviolet absorbers, basic compounds, leveling agents, matting agents, waxes, polymerization inhibitors, antioxidants, and tackifiers.

In view of ejectability from ink jet nozzles, the ink composition used in the present disclosure preferably has a viscosity of 0.5 mPa·s to 30 mPa·s, more preferably 0.5 mPa·s to 20 mPa·s, most preferably 1 mPa·s to 15 mPa·s, at the temperature during ejection. The compositional ratio is preferably adjusted and determined as appropriate so that the viscosity falls within such a range.

The ink composition preferably has a viscosity of 1 mPa·s to 200 mPa·s, more preferably 2 mPa·s to 50 mPa·s, particularly preferably 5 mPa·s to 30 mPa·s, at 23° C. This results in a higher adhesiveness and suitability for lamination.

The viscosity of the ink composition in the present disclosure is measured with a TV-22 viscometer (available from Toki Sangyo Co., Ltd.) under the above temperature conditions.

The ink composition used in the present disclosure preferably has a surface tension of 20 mN/m to 40 mN/m, more preferably 23 mN/m to 35 mN/m. When used for recording on various recording media such as polyolefin, PET, coated paper, and uncoated paper, the ink composition used in the present disclosure preferably has a surface tension of 20 mN/m or more from the viewpoint of bleeding and penetration and preferably has a surface tension of 40 mN/m or less from the viewpoint of wettability.

The surface tension of the ink composition in the present disclosure is measured with a CBVP-Z automatic surface tensiometer (available from Kyowa Interface Science, Inc.) at a liquid temperature of 25° C.

Method for Manufacturing Laminated Printed Matter

A method for manufacturing laminated printed matter according to the present disclosure includes a step of laminating a lamination film on a surface, on which an ink composition has been cured, of printed matter produced by the ink jet recording method according to the present disclosure.

The laminated printed matter according to the present disclosure is manufactured by the method for manufacturing laminated printed matter according to the present disclosure.

The laminated printed matter manufactured by the method for manufacturing laminated printed matter according to the present disclosure may be further processed into any shape or may be cut into any size as desired.

Laminating Step

The method for manufacturing laminated printed matter according to the present disclosure includes a step of laminating a lamination film on a surface, on which an ink composition has been cured, of printed matter produced by the ink jet recording method according to the present disclosure.

Lamination inhibits the leaching of ink components from the printed matter, blocking, and the volatilization and leaching of residual monomer. The resulting laminated printed matter is particularly preferred for use in food packaging.

Examples of lamination films suitable for use include resin films such as polyethylene terephthalate films, polypropylene films, nylon films, polyvinyl chloride films, polyethylene films, and triacetyl cellulose films. These films may be biaxially stretched.

Particularly preferred lamination films are polyethylene films and polypropylene films.

The lamination film preferably has a thickness of 10 μm to 100 μm, more preferably 10 μm to 75 μm, particularly preferably 10 μm to 50 μm. Even for such thin lamination films, the method for manufacturing laminated printed matter according to the present disclosure provides high suitability for lamination.

The thickness of a film or recording medium may be measured by observing a cross section perpendicular to the direction along the plane of the film or recording medium or may be measured with a stainless steel digital caliper (available from BIGMAN).

An example lamination method suitable for the laminating step is dry lamination.

The use of an adhesive is suitable for lamination in the laminating step.

The adhesive may be any adhesive, including known adhesives. The adhesive can be applied by known methods.

In the laminating step, the adhesive may be applied to the surface of the printed matter produced by the ink jet recording method according to the present disclosure before the lamination film is laminated thereon. Alternatively, the adhesive may be applied to the lamination film in advance before the lamination film is laminated on the surface of the printed matter produced by the ink jet recording method according to the present disclosure.

EXAMPLES

Embodiments of the present invention will now be described in detail with reference to the following examples, although these examples are not intended to limit the present disclosure. Parts and percentages are by mass unless otherwise specified.

The details of the individual components used in the Examples and the Comparative Examples are shown below.

Monomers

SR344 (available from Sartomer, the following compound)

IBOA (available from Sartomer, the following compound)

NVC (N-vinylcaprolactam, available from BASF Japan Ltd.)

SR341 (3-methyl-1,5-pentanediol diacrylate, available from Sartomer)

TMPTA (trimethylolpropane triacrylate, available from Sartomer)

SR444 (pentaerythritol triacrylate, available from Sartomer)

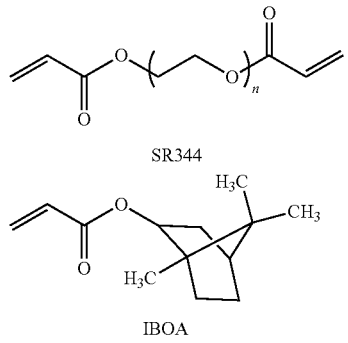

SR344

IBOA n = 9

Silicone Surfactant

BYK-307 (silicone surfactant (polyether-modified polydimethylsiloxane), available from BYK Chemie)

Polymerization Inhibitor

UV-12 (FLORSTAB UV-12, nitroso polymerization inhibitor, tris(N-nitroso-N-phenylhydroxylamine) aluminum salt, available from Kromachem)

Photopolymerization Initiators

Irg 819: IRGACURE 819 (bis(2,4,6-trimethylbenzoyl) phenylphosphine oxide, available from BASF)

Speedcure 7010 (1,3-di({α-[1-chloro-9-oxo-9H-thioxanthen-4-yl]oxy}acetylpoly[oxy(1-methylethylene)]oxy)-2,2-bis({α-[1-chloro-9-oxo-9H-thioxanthen-4-yl]oxy}acetylpoly[oxy(1-methylethylene)]oxymethyl) propane, CAS No. 1003567-83-6, SPEEDCURE 7010 available from Lambson)

Colorants

IRGALITE BLUE GLVO (cyan pigment, available from BASF Japan Ltd.)

CINQUASIA MAGENTA RT-355-D (magenta pigment, available from BASF Japan Ltd.)

NOVOPERM YELLOW H2G (yellow pigment, available from Clariant)

SPECIAL BLACK 250 (black pigment, available from BASF Japan Ltd.)

KRONOS 2300 (white pigment, available from KRONOS)

Dispersing Agents

SOLSPERSE 32000 (dispersing agent available from Noveon)

SOLSPERSE 41000 (dispersing agent available from Noveon)

Preparation of Mill Bases

Preparation of Cyan Mill Base

A cyan mill base was prepared by mixing 300 parts by mass of IRGALITE BLUE GLVO, 620 parts by mass of SR341, and 80 parts by mass of SOLSPERSE 32000 with stirring. The pigment mill base was prepared by placing the ingredients into a Motor Mill M50 disperser (available from Eiger) and dispersing them with zirconia beads having a diameter of 0.65 mm at a rotation speed of 9 m/s for 4 hours.

Preparation of Magenta Mill Base

M pigment (magenta pigment): CINQUASIA MAGENTA RT-355-D (available from BASF Japan Ltd.): 30 parts by mass SR341: 50 parts by mass SOLSPERSE 32000: 20 parts by mass A magenta mill base was prepared by mixing the above ingredients with stirring. The pigment mill base was prepared by placing the ingredients into a Motor Mill M50 disperser (available from Eiger) and dispersing them with zirconia beads having a diameter of 0.65 mm at a rotation speed of 9 m/s for 8 hours.

Preparation of Yellow Mill Base

Y pigment (yellow pigment): NOVOPERM YELLOW H2G (available from Clariant): 30 parts by mass SR341: 50 parts by mass SOLSPERSE 32000: 20 parts by mass A yellow mill base was prepared by mixing the above ingredients with stirring. The pigment mill base was prepared by placing the ingredients into a Motor Mill M50 disperser (available from Eiger) and dispersing them with zirconia beads having a diameter of 0.65 mm at a rotation speed of 9 m/s for 8 hours.

Preparation of Black Mill Base

K pigment (black pigment): SPECIAL BLACK 250 (available from BASF Japan Ltd.): 30 parts by mass SR341: 50 parts by mass SOLSPERSE 32000: 20 parts by mass A black mill base was prepared by mixing the above ingredients with stirring. The pigment mill base was prepared by placing the ingredients into a Motor Mill M50 disperser (available from Eiger) and dispersing them with zirconia beads having a diameter of 0.65 mm at a rotation speed of 9 m/s for 8 hours.

Preparation of White Mill Base

W pigment (white pigment): KRONOS 2300 (white pigment, available from KRONOS): 50 parts by mass SR341: 45 parts by mass SOLSPERSE 41000: 5 parts by mass A white mill base was prepared by mixing the above ingredients with stirring. The pigment mill base was prepared by placing the ingredients into a Motor Mill M50 disperser (available from Eiger) and dispersing them with zirconia beads having a diameter of 0.65 mm at a rotation speed of 9 m/s for 8 hours.

Preparation of Ink Compositions

Ink compositions (Ink Sets 1 to 4) were prepared by mixing the mill bases and other additives according to the formulations shown in Tables 1 to 4 below with stirring.

In Tables 1 to 4 below, the values other than volume shrinkage for each ingredient are in parts by mass.

As for the colors of the ink compositions, C denotes cyan, M denotes magenta, Y denotes yellow, K denotes black, and W denotes white).

TABLE 1

| | | Ink Set No. 1 Color of ink composition | | | | |
|---|---|---|---|---|---|---|
| | | C | M | Y | K | W |
| Monomer | SR341 | — | — | — | — | — |
| | SR344 | — | — | — | — | — |
| | NVC | 20 | 20 | 20 | 20 | 20 |
| | IBOA | 64.1 | 57.6 | 63.1 | 67.6 | 43.6 |
| | TMPTA | — | — | — | — | — |
| | SR444 | — | — | — | — | — |
| Polymerization initiator | Irg 819 | 4 | 4 | 4 | 4 | 4 |
| | Speedcure 7010 | 2 | 2 | 2 | 2 | 2 |
| Mill base | Cyan mill base | 9.5 | — | — | — | — |
| | Magenta mill base | — | 16 | — | — | — |
| | Yellow mill base | — | — | 10.5 | — | — |
| | Black mill base | — | — | — | 6 | — |
| | White mill base | — | — | — | — | 30 |
| Polymerization inhibitor | UV-12 | 0.3 | 0.3 | 0.3 | 0.3 | 0.3 |
| Surfactant | BYK-307 | 0.1 | 0.1 | 0.1 | 0.1 | 0.1 |
| Total | | 100 | 100 | 100 | 100 | 100 |
| Volume shrinkage (%) | | 6 | 6 | 6 | 6 | 6 |

TABLE 2

| | | Ink Set No. 2 Color of ink composition | | | | |
|---|---|---|---|---|---|---|
| | | C | M | Y | K | W |
| Monomer | SR341 | 20 | 20 | 20 | 20 | 20 |
| | SR344 | — | — | — | — | — |
| | NVC | 20 | 20 | 20 | 20 | 20 |
| | IBOA | 44.1 | 37.6 | 43.1 | 47.6 | 23.6 |
| | TMPTA | — | — | — | — | — |
| | SR444 | — | — | — | — | — |
| Polymerization initiator | Irg 819 | 4 | 4 | 4 | 4 | 4 |
| | Speedcure 7010 | 2 | 2 | 2 | 2 | 2 |
| Mill base | Cyan mill base | 9.5 | — | — | — | — |
| | Magenta mill base | — | 16 | — | — | — |
| | Yellow mill base | — | — | 10.5 | — | — |
| | Black mill base | — | — | — | 6 | — |
| | White mill base | — | — | — | — | 30 |
| Polymerization inhibitor | UV-12 | 0.3 | 0.3 | 0.3 | 0.3 | 0.3 |
| Surfactant | BYK-307 | 0.1 | 0.1 | 0.1 | 0.1 | 0.1 |
| Total | | 100 | 100 | 100 | 100 | 100 |
| Volume shrinkage (%) | | 12 | 12 | 12 | 12 | 12 |

TABLE 3

| | | Ink Set No. 3 Color of ink composition | | | | |
|---|---|---|---|---|---|---|
| | | C | M | Y | K | W |
| Monomer | SR341 | 64.1 | 57.6 | 63.1 | 67.6 | 43.6 |
| | SR344 | 20 | 20 | 20 | 20 | 20 |
| | NVC | — | — | — | — | — |
| | IBOA | — | — | — | — | — |
| | TMPTA | — | — | — | — | — |
| | SR444 | — | — | — | — | — |
| Polymerization initiator | Irg 819 | 4 | 4 | 4 | 4 | 4 |
| | Speedcure 7010 | 2 | 2 | 2 | 2 | 2 |
| Mill base | Cyan mill base | 9.5 | — | — | — | — |
| | Magenta mill base | — | 16 | — | — | — |
| | Yellow mill base | — | — | 10.5 | — | — |
| | Black mill base | — | — | — | 6 | — |
| | White mill base | — | — | — | — | 30 |
| Polymerization inhibitor | UV-12 | 0.3 | 0.3 | 0.3 | 0.3 | 0.3 |
| Surfactant | BYK-307 | 0.1 | 0.1 | 0.1 | 0.1 | 0.1 |
| Total | | 100 | 100 | 100 | 100 | 100 |
| Volume shrinkage (%) | | 18 | 18 | 18 | 18 | 18 |

TABLE 4

| | | Ink Set No. 4 Color of ink composition | | | | |
|---|---|---|---|---|---|---|
| | | C | M | Y | K | W |
| Monomer | SR341 | 64.1 | 57.6 | 63.1 | 67.6 | 43.6 |
| | SR344 | — | — | — | — | — |
| | NVC | — | — | — | — | — |
| | IBOA | — | — | — | — | — |
| | TMPTA | 10 | 10 | 10 | 10 | 10 |
| | SR444 | 10 | 10 | 10 | 10 | 10 |
| Polymerization initiator | Irg 819 | 4 | 4 | 4 | 4 | 4 |
| | Speedcure 7010 | 2 | 2 | 2 | 2 | 2 |
| Mill base | Cyan mill base | 9.5 | — | — | — | — |
| | Magenta mill base | — | 16 | — | — | — |
| | Yellow mill base | — | — | 10.5 | — | — |
| | Black mill base | — | — | — | 6 | — |
| | White mill base | — | — | — | — | 30 |
| Polymerization inhibitor | UV-12 | 0.3 | 0.3 | 0.3 | 0.3 | 0.3 |
| Surfactant | BYK-307 | 0.1 | 0.1 | 0.1 | 0.1 | 0.1 |
| Total | | 100 | 100 | 100 | 100 | 100 |
| Volume shrinkage (%) | | 25 | 25 | 25 | 25 | 25 |

The volume shrinkage (%) of the ink compositions was determined using a CUSTRON EU201C (available from AcroEdge Corporation). Each ink composition was injected into a polytetrafluoroethylene ring for the above device. The ring was set such that a load cell (stress-measuring means) contacted the surface of the injected ink composition. The ink composition was exposed to ultraviolet (UV) light at 100 mW/cm² in air at 1 atmosphere for 1 second. The amount of shrinkage of the cured product was measured and used to calculate the volume shrinkage (%) of the ink composition.

Examples 1 to 43 and Comparative Examples 1 to 5

Printing Method

In the roller transport system shown in FIG. 1, black ink jet heads, an LED light source, cyan ink jet heads, an LED light source, magenta ink jet heads, an LED light source, white ink jet heads, and a nitrogen ($N_2$)-purged LED exposure device were arranged in the above order as the ink jet ejection and curing unit 18.

As the ink jet heads, four CA3 heads available from Toshiba Tec Corporation were arranged in juxtaposition for each color. The heads were warmed to 45° C., and the frequency was controlled to form images at a droplet size of 42 pL. As the LED light sources, LED light source units with a peak wavelength of 385 nm (LEDZero Solidcure, available from Integration Technology) were used. Nitrogen purging was performed using, as an inert gas source, a Maxi-Flow 30 $N_2$ gas generator with a compressor (available from Inhouse Gas) connected at a pressure of 0.2 MPa·s. By allowing nitrogen to flow at a flow rate of 2 L/min to 10 L/min, the nitrogen concentration was set so that the oxygen partial pressure in the blanket was 0.1 atm. As the recording media, polyethylene terephthalate (PET) substrates (Product No. FE2001, substrate thickness: 12 μm, available from Futamura Chemical Co., Ltd.) were used. The ink compositions were ejected while the heads were scanned at a speed of 50 m/min. The ink compositions were then semi-cured with the LED light sources (at an exposure level of 10 W/cm² for semi-curing, UV-LED, available from HOYA Corporation) to form image areas. The images were then completely cured with the nitrogen ($N_2$)-purged LED exposure device (at an exposure level of 100 mJ/cm²) to obtain printed matter.

The intensity of the light emitted from the LED light sources before nitrogen purging exposure was adjusted so that the ink compositions remained semi-cured.

In addition, printing was performed while the unwinding and winding stresses in the recording media were adjusted as shown in Tables 5 to 9 using the rotational-torque adjusting devices for the unwinding roller 12 and the winding roller 22.

In the method for measuring the unwinding and winding stresses, the tension was measured with LE-30CTN tensiometers available from Mitsubishi Electric Corporation, one attached between the unwinding roller 12 and the ink jet ejection and curing unit 18 and the other attached between the ink jet ejection and curing unit 18 and the winding roller 22 for use as the unwinding-stress measuring means 16 and the winding-stress measuring means 20, respectively, shown in FIG. 1.

The tension, which was measured in N, was divided by the substrate width (m) and the unit length (m) of the substrate in the unwinding and winding direction. The calculated value was used as the unwinding or winding stress (Pa).

The resulting printed matter was subjected to the various performance tests shown below.

Evaluation Methods

Transport Accuracy

The ink sets shown in Tables 5 to 9 were used to print thin lines with a width of 0.2 mm and a length of 2 cm (average film thickness: 10 μm) at 50 m/min by the printing method described above at the unwinding and winding stresses shown in Tables 5 to 9. The YMCKW inks were deposited at the same positions. Transport accuracy was determined based on how much the printed YMCKW thin lines with a width of 0.2 mm were misaligned.

5: The YMCKW thin lines were misaligned by less than 0.20 mm.

4: The YMCKW thin lines were misaligned by 0.20 mm to less than 0.25 mm.

3: The YMCKW thin lines were misaligned by 0.25 mm to less than 0.30 mm.

2: The YMCKW thin lines were misaligned by 0.30 mm to less than 0.35 mm.

1: The YMCKW thin lines were misaligned by 0.35 mm or more.

A rating of 5 is the best, and ratings of 3 or higher are acceptable for practical use.

Suitability for Lamination

A lamination adhesive (the trade names KO-55 and LX-500 (used as a mixture at KO-55:LX-500=1:9, both available from DIC Corporation)) was applied at a thickness of 2 to 4,000 m long printed matter produced by the printing method described above using the ink sets shown in Tables 5 to 9 at the unwinding and winding stresses shown in Tables 5 to 9. The lamination films shown below were then laminated with an SDL-1300 dry laminator available from Sobu Machinery Co., Ltd. at a speed of 100 m/min, followed by a drying process at 70° C. for 1 minute.

Figure 2:
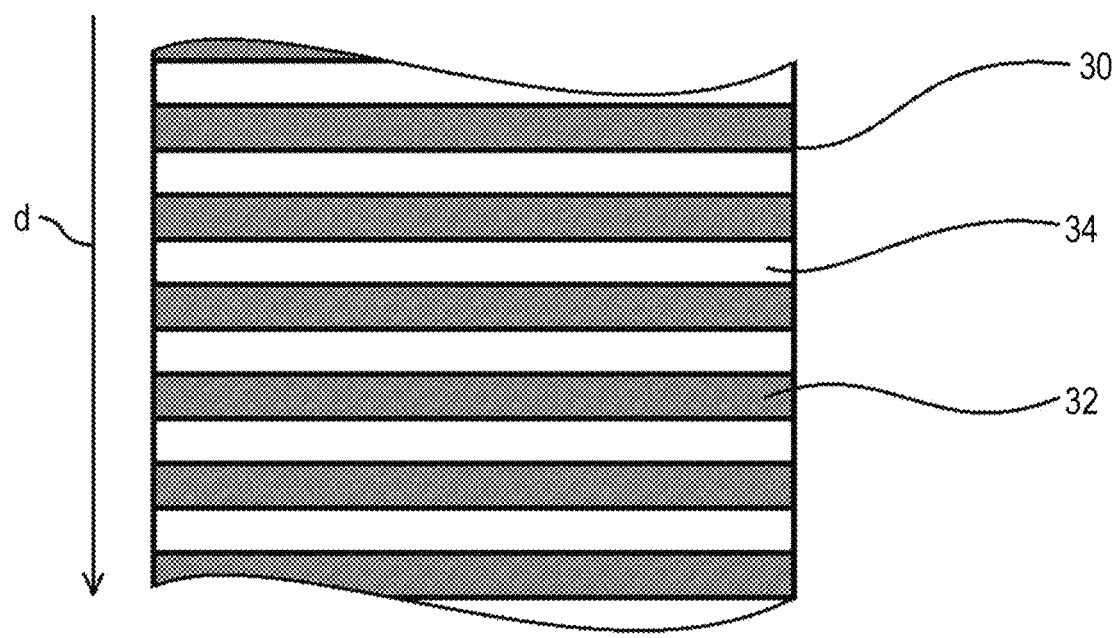
FIG. 2 is a simplified schematic view of an example of image and non-image areas in a method for manufacturing laminated printed matter according to the present disclosure.

In the printing method, a striped image shown in FIG. 2 was formed to obtain printed matter. The widths of image areas 32 and non-image areas 34 in a transport direction d were each 3 cm. The lateral width of a recording medium 30 (the length in the direction orthogonal to the transport direction) was 54 cm.

The solid images in the image areas 32 were formed of 20% by volume of the yellow (Y) ink, 20% by volume of the magenta (M) ink, 20% by volume of the cyan (C) ink, 20% by volume of the black (K) ink, and 20% by volume of the white (W) ink and had an average thickness of 20 μm.

The rating scale for suitability for lamination is shown below:

5: Lamination was accomplished without any bubble trapped over the 4,000 m long printed matter.

4: Lamination was accomplished without any bubble trapped over a length of 3,500 m to less than 4,000 m.

3: Lamination was accomplished without any bubble trapped over a length of 3,000 m to less than 3,500 m.

2: Lamination was accomplished without any bubble trapped over a length of 2,500 m to less than 3,000 m.

1: Bubbles were trapped within a length of less than 2,500 m.

Ratings of 2 or higher are acceptable for practical use.

Adhesiveness (Adhesion between Lamination Film and Ink Film)

A 1 cm wide cellophane tape was applied to the laminated surface of the laminated printed matter obtained in the evaluation of suitability for lamination. The peeling force between the lamination film and the ink film (the force required for peeling in N/cm, peeling speed: 300 mm/min) was measured with a ZTS series standard-type digital force gauge, an MX2 series vertical motorized test stand, a P90-200N/200N-EZ 90° peel test fixture, and an FC series film chuck available from Imada Co., Ltd. The rating scale is shown below, where a larger peeling force indicates a better adhesiveness:

5: 0.5 N/cm or more
4: 0.25 N/cm to less than 0.5 N/cm
3: 0.1 N/cm to less than 0.25 N/cm
2: 0.05 N/cm to less than 0.1 N/cm
1: less than 0.05 N/cm Ratings of 3 or higher are acceptable for practical use.

Adhesiveness (Adhesion between Ink Film and Substrate (Recording Medium))

A 1 cm wide cellophane tape was applied to the surface of the ink film on the substrate of printed matter produced by the printing method described above using the ink sets shown in Tables 5 to 9 at the unwinding and winding stresses shown in Tables 5 to 9. The peeling force between the substrate and the ink film (the force required for peeling (unit: N/cm), peeling speed: 300 mm/min) was measured with a ZTS series standard-type digital force gauge, an MX2 series vertical motorized test stand, a P90-200N/200N-EZ 90° peel test fixture, and an FC series film chuck available from Imada Co., Ltd.

A larger peeling force indicates a better adhesiveness.

5: 0.5 N/cm or more
4: 0.3 N/cm to less than 0.5 N/cm
3: 0.1 N/cm to less than 0.3 N/cm
2: 0.05 N/cm to less than 0.1 N/cm
1: less than 0.05 N/cm Ratings of 3 or higher are acceptable for practical use.

The evaluation results for the Examples and the Comparative Examples are summarized in Tables 5 to 9 shown below.

TABLE 5

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Ink Set No. | | 1 | 1 | 1 | 1 | 1 | 1 | 2 | 2 | 2 | 2 |
| Volume shrinkage (%) | | 6 | 6 | 6 | 6 | 6 | 6 | 12 | 12 | 12 | 12 |
| Unwinding stress (Pa) | | 300 | 250 | 200 | 100 | 70 | 50 | 300 | 260 | 250 | 200 |
| Winding stress (Pa) | | 252 | 202 | 152 | 52 | 22 | 2 | 204 | 164 | 154 | 104 |
| Unwinding stress − winding stress (Pa) | | 48 | 48 | 48 | 48 | 48 | 48 | 96 | 96 | 96 | 96 |
| $F^A$ | | 8.0 | 8.0 | 8.0 | 8.0 | 8.0 | 8.0 | 8.0 | 8.0 | 8.0 | 8.0 |
| Suitability for lamination (with various lamination films) | | 3 | 4 | 5 | 5 | 4 | 4 | 3 | 4 | 5 | 5 |
| Adhesiveness | Between various lamination films and ink film | 3 | 4 | 5 | 5 | 4 | 3 | 3 | 4 | 5 | 5 |
| | Between ink film and substrate | 4 | 4 | 5 | 5 | 5 | 4 | 4 | 4 | 5 | 5 |
| Transport accuracy | | 5 | 5 | 5 | 5 | 4 | 5 | 5 | 5 | 5 | 5 |

TABLE 6

| | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Ink Set No. | | 2 | 2 | 3 | 3 | 3 | 3 | 3 | 3 | 3 | 4 |
| Volume shrinkage (%) | | 12 | 12 | 18 | 18 | 18 | 18 | 18 | 18 | 18 | 25 |
| Unwinding stress (Pa) | | 120 | 100 | 320 | 300 | 250 | 200 | 170 | 150 | 95 | 380 |
| Winding stress (Pa) | | 24 | 4 | 176 | 156 | 106 | 56 | 26 | 6 | 6 | 180 |
| Unwinding stress − winding stress (Pa) | | 96 | 96 | 144 | 144 | 144 | 144 | 144 | 144 | 89 | 200 |
| $F^A$ | | 8.0 | 8.0 | 8.0 | 8.0 | 8.0 | 8.0 | 8.0 | 8.0 | 4.9 | 8.0 |
| Suitability for lamination (with various lamination films) | | 4 | 4 | 3 | 4 | 5 | 5 | 5 | 4 | 4 | 3 |
| Adhesiveness | Between various lamination films and ink film | 4 | 3 | 3 | 4 | 5 | 5 | 5 | 4 | 3 | 3 |
| | Between ink film and substrate | 5 | 4 | 4 | 4 | 5 | 5 | 5 | 5 | 4 | 4 |
| Transport accuracy | | 4 | 5 | 5 | 5 | 5 | 5 | 5 | 4 | 5 | 5 |

TABLE 7

|  | Example 21 | Example 22 | Example 23 | Example 24 | Example 25 | Example 26 | Example 27 | Example 28 | Example 29 | Example 30 |
|---|---|---|---|---|---|---|---|---|---|---|
| Ink Set No. | 4 | 4 | 4 | 4 | 3 | 3 | 3 | 3 | 3 | 3 |
| Volume shrinkage (%) | 25 | 25 | 25 | 25 | 25 | 18 | 18 | 18 | 18 | 18 |
| Unwinding stress (Pa) | 360 | 250 | 220 | 210 | 95 | 280 | 260 | 260 | 260 | 260 |
| Winding stress (Pa) | 160 | 50 | 20 | 10 | 6 | 278 | 258 | 242 | 224 | 188 |
| Unwinding stress − winding stress (Pa) | 200 | 200 | 200 | 200 | 89 | 2 | 2 | 18 | 36 | 72 |
| $F^A$ | 8.0 | 8.0 | 8.0 | 8.0 | 3.6 | 0.1 | 0.1 | 1.0 | 2.0 | 4.0 |
| Suitability for lamination (with various lamination films) | 4 | 5 | 5 | 4 | 4 | 3 | 3 | 4 | 4 | 4 |
| Adhesiveness Between various lamination films and ink film | 4 | 5 | 5 | 4 | 3 | 3 | 3 | 3 | 4 | 4 |
| Between ink film and substrate | 4 | 5 | 5 | 5 | 4 | 3 | 4 | 4 | 4 | 5 |
| Transport accuracy | 5 | 5 | 5 | 4 | 5 | 5 | 5 | 5 | 5 | 5 |

TABLE 8

|  | Example 31 | Example 32 | Example 33 | Example 34 | Example 35 | Example 36 | Example 37 | Example 38 | Example 39 | Example 40 |
|---|---|---|---|---|---|---|---|---|---|---|
| Ink Set No. | 3 | 3 | 3 | 3 | 3 | 3 | 2 | 2 | 2 | 2 |
| Volume shrinkage (%) | 18 | 18 | 18 | 18 | 18 | 18 | 12 | 12 | 12 | 12 |
| Unwinding stress (Pa) | 260 | 260 | 260 | 375 | 375 | 375 | 250 | 250 | 250 | 250 |
| Winding stress (Pa) | 116 | 80 | 20 | 75 | 15 | 5 | 232 | 225 | 202 | 154 |
| Unwinding stress − winding stress (Pa) | 144 | 180 | 240 | 300 | 360 | 370 | 18 | 25 | 48 | 96 |
| $F^A$ | 8.0 | 10.0 | 13.3 | 16.7 | 20.0 | 20.6 | 1.5 | 2.1 | 4.0 | 8.0 |
| Suitability for lamination (with various lamination films) | 5 | 5 | 5 | 5 | 4 | 3 | 4 | 4 | 4 | 5 |
| Adhesiveness Between various lamination films and ink film | 5 | 5 | 5 | 5 | 4 | 3 | 3 | 4 | 4 | 5 |
| Between ink film and substrate | 5 | 5 | 5 | 5 | 4 | 4 | 4 | 4 | 5 | 5 |
| Transport accuracy | 5 | 5 | 5 | 4 | 3 | 3 | 5 | 5 | 5 | 5 |

TABLE 9

|  | Example 41 | Example 42 | Example 43 | Comparative Example 1 | Comparative Example 2 | Comparative Example 3 | Comparative Example 4 | Comparative Example 5 |
|---|---|---|---|---|---|---|---|---|
| Ink Set No. | 2 | 2 | 2 | 3 | 4 | 1 | 2 | 4 |
| Volume shrinkage (%) | 12 | 12 | 12 | 18 | 25 | 6 | 12 | 12 |
| Unwinding stress (Pa) | 250 | 250 | 250 | 20 | 20 | 20 | 20 | 59 |
| Winding stress (Pa) | 58 | 40 | 10 | 59 | 39 | 157 | 78 | 59 |
| Unwinding stress − winding stress (Pa) | 192 | 210 | 240 | −39 | −19 | −137 | −58 | 0 |
| $F^A$ | 16.0 | 17.5 | 20.0 | −2.2 | −1.0 | −23.0 | −4.9 | 0.0 |
| Suitability for lamination (with various lamination films) | 5 | 4 | 4 | 1 | 1 | 1 | 1 | 1 |
| Adhesiveness Between various lamination films and ink film | 5 | 4 | 4 | 1 | 1 | 1 | 1 | 1 |
| Between ink film and substrate | 5 | 5 | 4 | 1 | 1 | 2 | 2 | 1 |
| Transport accuracy | 4 | 3 | 3 | 1 | 1 | 2 | 2 | 5 |

"F$^4$" shown in Tables 5 to 9 denotes F$^4$ described above, i.e., (unwinding stress (Pa)−winding stress (Pa))/volume shrinkage (%).

In each of the Examples and the Comparative Examples, the evaluation results of suitability for lamination shown in Tables 5 to 9 were identical no matter which of the TUX-MCS and GHC lamination films shown below was laminated.

TUX-MCS: linear low-density polyethylene (LLDPE) film, thickness: 40 μm, available from Mitsui Chemicals Tohcello Inc.

GHC: cast polypropylene (CP) film, thickness: 60 μm, available from Mitsui Chemicals Tohcello Inc.

As can be seen from the results in Tables 5 to 9, the ink jet recording method according to the present disclosure provides high adhesiveness between a cured film of an ink composition (ink film) and a recording medium.

As can be seen from the results in Tables 5 to 9, the ink jet recording method according to the present disclosure also provides high transport accuracy, suitability for lamination, and adhesiveness between a cured film of an ink composition and a lamination film.

The results for Examples 1 to 25, for example, show that a winding stress of 20 Pa to 160 Pa and an unwinding stress of 100 Pa to 270 Pa result in a higher suitability for lamination, adhesiveness between a cured film of an ink composition and a recording medium, and adhesiveness between a cured film of an ink composition and a lamination film.

The results for Examples 26 to 43, for example, show that a value of (unwinding stress−winding stress) of 50 Pa to 250 Pa results in a higher suitability for lamination, adhesiveness between a cured film of an ink composition and a recording medium, and adhesiveness between a cured film of an ink composition and a lamination film.

In addition, the results for Examples 26 to 43, for example, show that an F$^4$ of 2 to 17 results in a higher suitability for lamination, adhesiveness between a cured film of an ink composition and a recording medium, and adhesiveness between a cured film of an ink composition and a lamination film.

Example 44

Printed matter was produced as in Example 3 except that the oxygen partial pressure in the blanket was adjusted to 0.01 atm, 0.05 atm, 0.15 atm, or the same oxygen partial pressure as air, and was evaluated as described above. The evaluation results were similar to those for Example 3 at any oxygen partial pressure.

The entire disclosure of JP2017-015857 filed Jan. 31, 2017 is incorporated herein by reference.

All documents, patent applications, and technical standards recited herein are incorporated herein by reference to the same extent as when it is specifically and individually stated that the individual documents, patent applications, and technical standards are incorporated by reference.

REFERENCE SIGNS LIST

10: ink jet recording apparatus, 12: unwinding roller, 14: recording medium, 16: unwinding-stress measuring means, 18: ink jet ejection and curing unit, 20: winding-stress measuring means, 22: winding roller, 30: recording medium, 32: image area, 34: non-image area, d: transport direction of recording medium

What is claimed is:

1. An ink jet recording method comprising:
ejecting an active-radiation-curable ink composition onto a recording medium by an ink jet process; and
curing the ejected ink composition by irradiation with active radiation,
wherein, during transporting of the recording medium in the ejecting and the curing, an unwinding stress in the recording medium is larger than a winding stress in the recording medium,
wherein the recording medium has a thickness of 10 μm to 100 μm, and
wherein a value of subtracting the winding stress from the unwinding stress is 50 Pa to 250 Pa.

2. The ink jet recording method according to claim 1, wherein F$^4$ is 2 to 17, F$^4$ being defined by the following equation:

$$F^4=(\text{unwinding stress}-\text{winding stress})/(\text{volume shrinkage of ink composition after curing}).$$

3. The ink jet recording method according to claim 1, wherein the winding stress is 20 Pa to 160 Pa.

4. The ink jet recording method according to claim 1, wherein the unwinding stress is 100 Pa to 270 Pa.

5. The ink jet recording method according to claim 1, wherein the recording medium is a resin film containing at least one resin selected from the group consisting of polyethylene terephthalate, polyethylene, polypropylene, and nylon.

6. The ink jet recording method according to claim 1, wherein the ink composition has a viscosity of 5 mPa·s to 30 mPa·s at 23° C.

7. The ink jet recording method according to claim 1, wherein a light source of the active radiation is a light-emitting diode.

8. The ink jet recording method according to claim 1, wherein the ink composition contains a polymerizable compound and a photopolymerization initiator.

9. The ink jet recording method according to claim 8, wherein the polymerizable compound includes a di- or higher-functional polymerizable compound.

10. The ink jet recording method according to claim 9, wherein a content of the di- or higher-functional polymerizable compound is 50% by mass or more based on a total mass of the ink composition.

11. The ink jet recording method according to claim 1, wherein the ink composition is irradiated with the active radiation in an atmosphere with an oxygen partial pressure of 0.15 atm or less in the curing.

12. A method for manufacturing laminated printed matter, comprising laminating a lamination film on a surface, on which an ink composition has been cured, of printed matter produced by the ink jet recording method according to claim 1.

* * * * *